United States Patent [19]

Hori et al.

[11] Patent Number: 5,068,147

[45] Date of Patent: Nov. 26, 1991

[54] SOFT MAGNETIC THIN FILM COMPRISING ALTERNATE LAYERS OF IRON CARBIDE WITH EITHER IRON, IRON NITRIDE OR IRON CARBON-NITRIDE

[75] Inventors: Tohru Hori, Ikoma; Masaki Aoki, Minou; Kenichi Fujii, Kobe, all of Japan

[73] Assignee: Matsushita Electric Industrial Co., Ltd., Osaka, Japan

[21] Appl. No.: 345,722

[22] Filed: Apr. 27, 1989

[30] Foreign Application Priority Data

Apr. 28, 1988 [JP] Japan .................... 63-106372

[51] Int. Cl.⁵ ............................ G11B 23/00
[52] U.S. Cl. ............... 428/336; 428/693; 428/694; 428/900
[58] Field of Search ........... 428/336, 611, 685, 693, 428/694, 900, 928

[56] References Cited

U.S. PATENT DOCUMENTS

| | | | |
|---|---|---|---|
| 4,610,935 | 9/1986 | Kumasaka et al. | 428/632 |
| 4,775,576 | 10/1988 | Bouchand et al. | 428/216 |
| 4,847,161 | 7/1989 | Rupp | 428/450 |

FOREIGN PATENT DOCUMENTS 62-264427 11/1987 Japan .
1-047852 2/1989 Japan .

OTHER PUBLICATIONS

Kazama, N. S. et al., "Preparation and Magnetic Properties of Amorphous Superlattice", Sci. Rep. Res. Inst. Tohoku Univ. A 32, (2), 141-153, Mar. 1985.

Menon, S. K. et al., "Microstructure of Metastable Metallic Alloy Films Produced by Laser CVD", Los Alamos National Lab. Report No. LA-UR-86-3811; Conf-861207-15.

J. Appl. Phys., vol. 63, No. 8, Apr. 15, 1988, pp. 3202-3205.

Magnetics Society of Japan, vol. 12, No. 3, 1988, pp. 460-464, abstract only.

*Primary Examiner*—Merrell C. Cashion, Jr.
*Assistant Examiner*—Stevan A. Resan
*Attorney, Agent, or Firm*—Wenderoth, Lind & Ponack

[57] ABSTRACT

In a soft-magnetic thin film, layers of iron carbide are laminated alternately with layers of at least one of iron, iron nitride and iron carbon-nitride and when needed, layers of non-magnetic material. The thin film provides particular features including 1) saturation magnetic flux density of at least 1.5 teslas; 2) relative permeability and coercive force greater than those of the conventional soft-magnetic material; and 3) durability for practical use.

15 Claims, 21 Drawing Sheets

SOFT MAGNETIC THIN FILM COMPRISING ALTERNATE LAYERS OF IRON CARBIDE WITH EITHER IRON, IRON NITRIDE OR IRON CARBON-NITRIDE

BACKGROUND OF THE INVENTION

1. Field of the Invention

The present invention relates to a thin film of soft magnetic material for a magnetic head, a magnetoresistor, or the like, and more particularly to a soft-magnetic thin film for a magnetic head having improved recording and reproducing characteristics for a high-density magnetic recording medium of high coercive force, and a method of making the same and also, a magnetic head using the same.

2. Description of the Prior Art

Ferrite materials of metallic oxide have been widely utilized for magnetic heads. Recently, permalloy (nickel-iron alloy) having high saturation magnetic flux density and Sendust (iron-aluminum-silicon alloy) have also been used.

More recently, amorphous materials having saturation magnetic flux density of 1.0–1.4 teslas (cobalt-zirconium amorphous alloy) have been developed and become used for a magnetic head in an 8 mm video taperecorder using a metal tape.

For responding to a demand for improvement in recording density, various magnetic materials having high saturation magnetic flux density have been introduced as above. Concurrently, improved recording mediums have also been developed such as a metal tape which has a coercive force of 1500 to 2000 Oe as compared with 600 to 700 Oe of the conventional oxide tape.

New generation magnetic recording media having much more coercive force for mass storage are under development. It is said that, to record data into such a high coercive force magnetic recording medium, a magnetic material for a magnetic head core is required to have a saturation magnetic flux density of at least 1.5 teslas (for example, as described in "Hitachi" journal, vol. 49, No. 6, pages 8 to 9).

Pure iron has a high saturation magnetic flux density of 2.2 teslas. However, pure iron is too low in magnetic permeability and durability to be used for a magnetic head.

For the purpose, there have been studied a multi-layer film of pure iron, an iron carbide film, an iron nitride film and multi-layer films of iron carbide or iron nitride. Unfortunately, such a soft-magnetic thin film having all of high saturation magnetic flux density, high permeability and high durability, has not yet been put into practical use.

Pure iron multi-layer films are described in Technical Report of the Institute of Electronics, Information and Communication Engineers of Japan, MR 88-16, pages 17 to 22, and in Japanese Unexamined Patent Publication No. 63-58806. Pure iron single-layer films are shown in Technical Reports of the Institute of Electronics, Information and Communication Engineers of Japan, MR 85-42, pages 7 to 14 and MR 87-26, pages 23 to 30. Iron carbide multi-layer films are shown in Japanese Journal of Applied Physics, vol. 63, No. 8, April 1988, pages 3203 to 3205 and Journal of the Magnetics Society of Japan, vol. 12, No. 3, 1988, pages 460 to 464. An iron carbide single-layer film is shown in Japanese Journal of Applied Physics, vol. 26, No. 1, January 1987, pages 28 to 31. An iron nitride multi-layer film is shown in Japanese Unexamined Patent Publication 62-285406. Iron nitride single-layer films are shown in Technical Report of the Institute of Electronics, Information and Communication Engineers of Japan, MR 85-21, pages 21 to 28, Journal of the Magnetics Society of Japan, vol. 11, No. 2, 1987, pages 295 to 298, and Digest of the 11th Annual Conference on Magnetics in Japan, 1987, 3pB-13. Multi-layer thin films having both high saturation magnetic flux density and high magnetic permeability are disclosed in Japanese Unexamined Patent Publication Nos. 61-97906 and 63-80509.

SUMMARY OF THE INVENTION

It is a primary object of the present invention to provide a soft-magnetic thin film having three particular properties: ①  high saturation magnetic flux density of at least 1.5 teslas; ②  magnetic permeability and coercive force which are comparable to or superior to those of the conventional soft-magnetic materials; and ③  high durability for practical use as a commercial product, and also provide a magnetic head employing the soft-magnetic thin film and a method of making the same with high efficiency.

To achieve the above object, a soft-magnetic thin film according to the present invention has a multi-layer structure in which layers of iron carbide and layers of at least one of iron, iron nitride and iron carbon-nitride are alternately laminated.

For the lamination of iron carbide layers and iron layers, it is preferable that each of the iron carbide layers contains carbon at a density providing a positive magnetostriction constant and has a thickness of 3 to 800 nm, and each of the iron layers is 0.5 to 60 nm in thickness.

For the lamination of iron carbide layers and iron nitride layers, it is preferable that each of the iron carbide layers contains 4 to 35 mole of carbon and has a thickness of 3 to 1000 nm, and each of the iron nitride layers is mainly composed of $\gamma Fe_4N$ and has a thickness of 0.6 to 200 nm.

For the lamination of iron carbide layers and iron carbon-nitride layers, it is preferable that each of the iron carbide layers contains 3 to 35 mole % of carbon and has a thickness of 0.5 to 1000 nm, and each of the iron carbon-nitride layers contains 0.2 to 15 mole % of nitrogen and has a thickness of 0.5 to 300 nm.

In a sputtering method of making a soft-magnetic multi-layer thin film comprising alternately laminated iron carbide layers and iron carbon-nitride layers, a nitrogen gas is supplied during sputtering so as to produce an iron carbon-nitride layer by using the same target as for producing an iron carbide layer.

DESCRIPTION OF THE PREFERRED EMBODIMENTS

Figure 1:
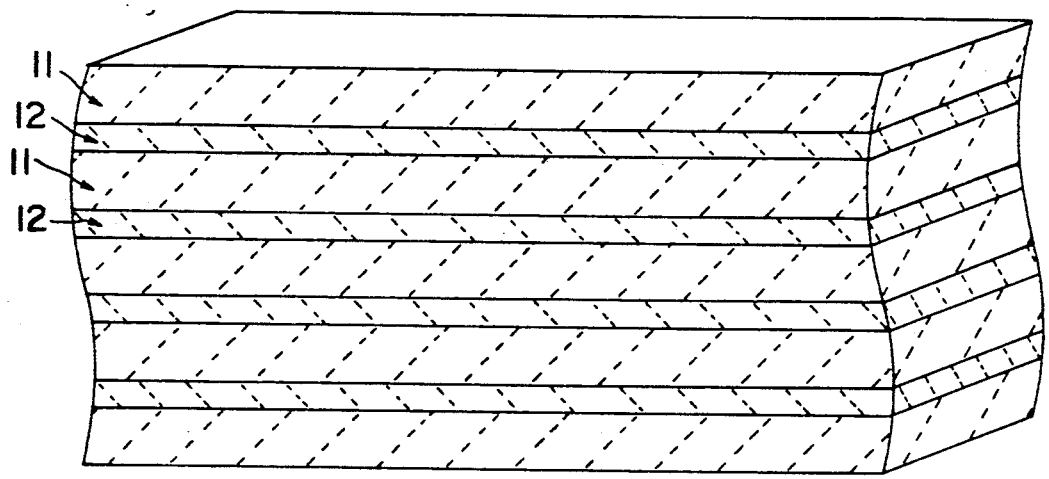
FIG. 1 is a perspective cross sectional view showing a layer arrangement of a soft-magnetic thin film according to the present invention, in which iron carbide layers and layers of iron, iron nitride or iron carbon-nitride are alternately laminated.
Figure 2:
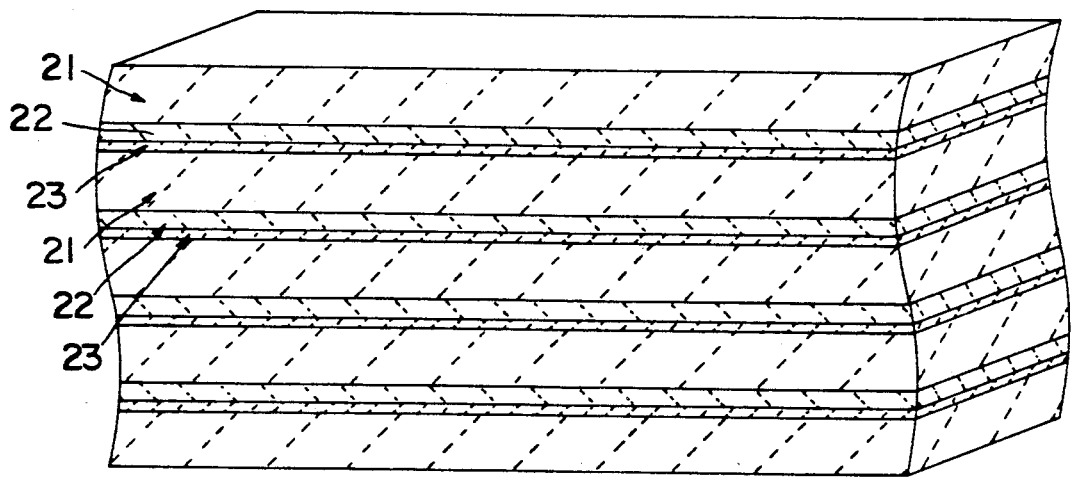
FIG. 2 is a perspective cross sectional view showing a layer arrangement of another soft-magnetic thin film according to the present invention, in which iron carbide layers, iron, iron nitride or iron carbon-nitride layers and non-magnetic material layers are laminated in a certain order repeatedly.

The present invention provides a soft-magnetic thin film having a multi-layer structure in which iron carbide layers 11 and iron, iron nitride or iron carbon-nitride layers 12 are alternately laminated as shown in FIG. 1, and another soft-magnetic thin film having another multi-layer structure in which iron carbide layers 21, iron, iron nitride or iron carbon-nitride layers 22 and non-magnetic material layers 23 of stable oxide such as silicon oxide or aluminum oxide are laminated in a certain order repeatedly as, for example, shown in FIG. 2.

Figure 39:
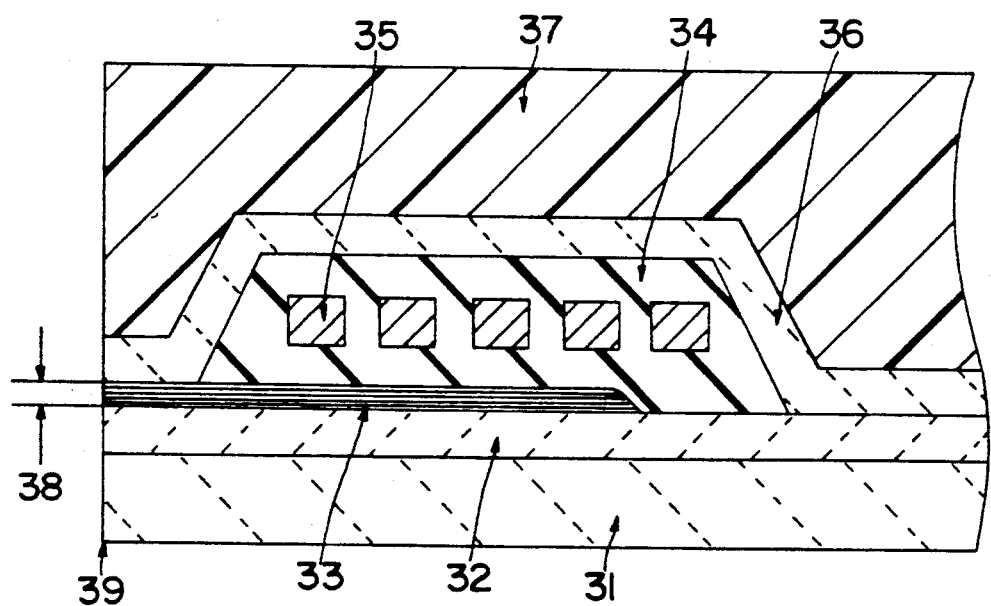
FIG. 39 is a fragmentary cross sectional view of a magnetic head embodying the present invention.

FIG. 39 is a fragmentary cross sectional view of a magnetic head using soft-magnetic films of the present invention, in which numeral 31 is a ceramic substrate of which surface is satisfactorily polished and cleaned down. Numeral 32 is a soft-magnetic thin film according to the present invention which is formed on the ceramic substrate 31 by, for example, sputtering and then, patterned into a predetermined magnetic core shape by ion milling or wet etching. Represented by 33, 34 and 35 are a gap material of, for example, silicon oxide, an organic insulation layer and a conductive coil, respectively, which are extensively overlaid in a particular order by a thin-film disposition process such as sputtering, and then patterned into specified shapes by ion milling or wet etching. Numeral 36 is another soft-magnetic thin film having the same multi-layer structure as that of the soft-magnetic thin film 31 and covered with a protective layer 37 of insulating material such as $Al_2O_3$. Such a laminated body as shown in FIG. 39 is cut out into a predetermined shape while a magnetic gap 38 is formed by polishing the head surface 39, to obtain a thin-film magnetic head.

Figure 40:
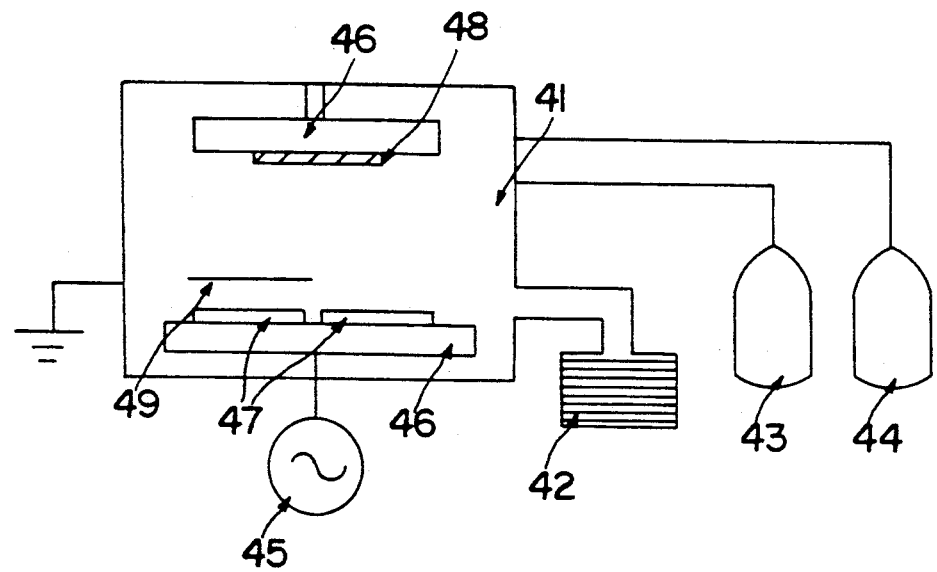
FIG. 40 is a schematic view showing an apparatus for making a magnetic thin film in a method of the present invention.

FIG. 40 is a schematic view showing an apparatus of making a soft-magnetic film according to the present invention and more specifically, a high-frequency sputtering apparatus. As shown in FIG. 40, there is provided a reaction chamber 41 exhausted through an exhaust system 42 and then, kept at 1.0 to $10 \times 10^{-4}$ Torr with gas being supplied from a couple of gas containers 43 and 44. Argon gas supplied from the argon container 43 into the reaction chamber 41 is changed to in a plasma state by the energy of radiowave wave applied between two electrodes 46 energized by a high-frequency power source 45 and, activates an iron carbide alloy target 47 to be sputtered. Sputtered iron carbide is then deposited on a substrate 48 of, for example, ceramic material to form an iron carbide thin film. During sputtering, when a particular amount of nitrogen gas is supplied from the nitrogen container 44 into the reaction chamber 41, an iron carbon-nitride layer is formed. Accordingly, a multi-layer film of alternately deposited iron carbide and iron carbon-nitride layers can be produced with a favorable thickness by merely controlling the duration and frequency of nitrogen supply from the nitrogen container 44 into the reaction chamber 41 without replacing the target 47. The iron carbide target 47 may be replaced by a combination of an iron target and an iron carbide alloy target or a combination of an iron nitride target and an iron carbide alloy target. In this case, with the use of a shutter 49 for selecting a proper target, a multi-layer film of either iron and iron carbide layers or of iron nitride and iron carbide layers can be formed.

The soft-magnetic thin films produced in Examples of the present invention described later were made to each have a thickness of 2 μm by adjusting the number of layers regardless of the thickness of each layer, and after formed, annealed at 320° C. for one hour. However, thickness of the soft-magnetic thin films used for producing magnetic heads were such as shown in Examples. The film thickness may be arbitrarily selected according to use. The temperature for annealing is preferably 300° C. to 350° C. depending on the materials of the layers to be combined.

Although the sputtering method was used for thin film preparation in the Examples, another method such as an ion plating and a plasma CVD method may be employed.

The layer 12 or 22 of iron, iron nitride or iron carbon-nitride consists of one layer as shown in FIG. 1 or 2, but may consist of two or more layers. As shown in FIG. 2, the non-magnetic material layer 23 is interposed between the iron, iron carbide or iron carbon-nitride layer 22 and the iron carbide layer 21, but it may be disposed at any position. Further, the number of non-magnetic material layers may not be the same as that of the magnetic material layers.

Furthermore, any magnetic head may be produced other than the one having the structure as shown in FIG. 39.

EXAMPLE 1

Various multi-layer films were produced as test pieces with the apparatus shown in FIG. 40, each consisting of iron carbide layers and iron layers and being different in layer thickness or carbon density from the other.

Table 1 shows the comparison of a soft-magnetic thin film according to the present invention with single-layer films of iron and of iron carbide in respect of magnetic properties. The soft-magnetic thin film of the invention comprises iron layers each of which has a thickness of 3 nm, and iron carbide layers each of which has a thickness of 30 nm and contains 9 mole % of carbon. One of the iron carbide single-layer films contains 3 mole of carbon while the other contains 27 mole % of carbon.

As shown in Table 1, the relative permeability was measured at 20 MHz, and the atmospheric durability was represented by a ratio of saturation magnetic flux densities between after and before exposure of the film to a 3% salt water vapor for 200 hours.

TABLE 1

|  | This invention | Pure iron | Iron carbide | Iron carbide |
|---|---|---|---|---|
| Carbon density (mole %) | 24% | 0% | 3% | 24% |
| Saturation magnetization kG | 18.9 | 21.5 | 20.7 | 12.4 |
| Coercive force Oe | 0.13 | 42 | 3.2 | 3.4 |
| Relative permeability μ | 3200 | 450 | 1300 | 780 |
| Durability $Ms_o/Ms$ | 1.02 | 0.27 | 0.45 | 1.10 |

It is apparent from Table 1 that the soft-magnetic thin film of the invention comprising iron carbide layers and iron layers laminated alternately is high in all of the saturation magnetic flux density, relative permeability and atmospheric durability, as compared with the single-layer films.

EXAMPLE 2

Figure 3:
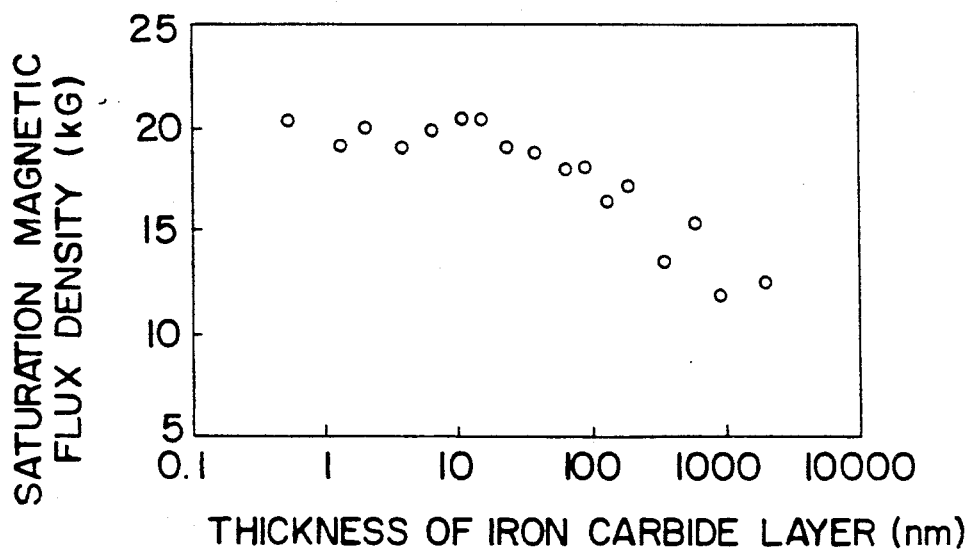
FIG. 3 is a graphic representation showing a relation between the saturation magnetic flux density of a magnetic thin film and the thickness of each iron carbide layer while the thickness of each iron layer remains unchanged.
Figure 4:
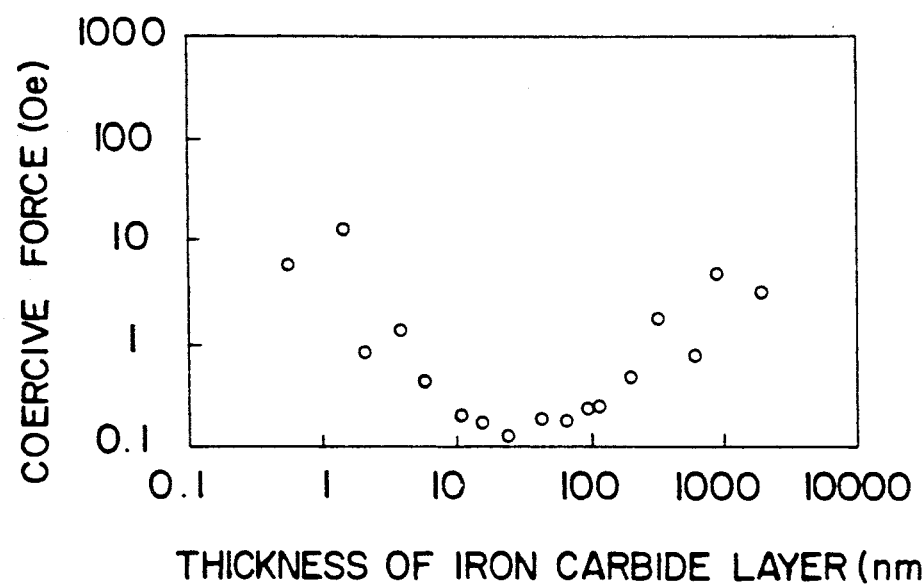
FIG. 4 is a graphic representation showing a relation between the coercive force of a magnetic thin film and the thickness of each iron layer while the thickness of each iron layer remains unchanged.
Figure 5:
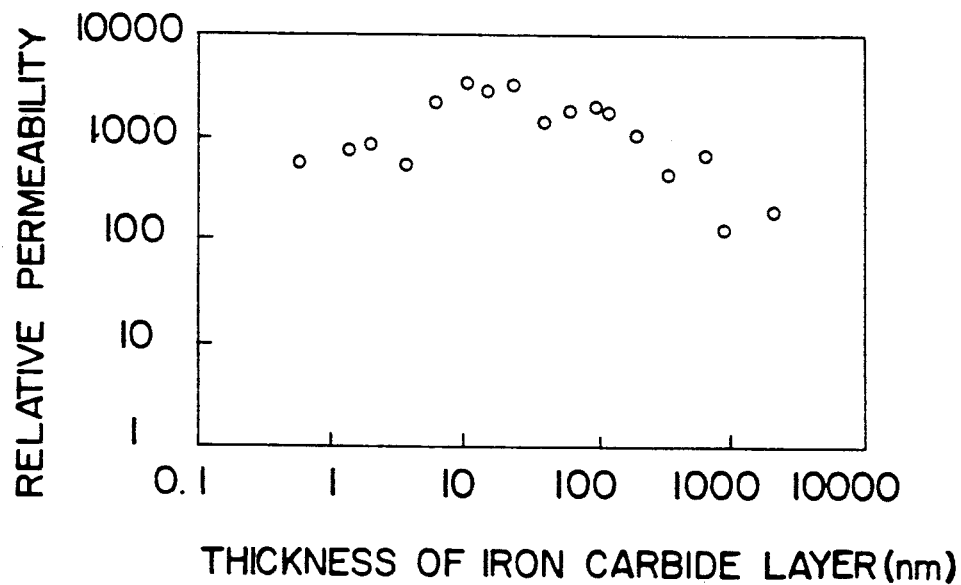
FIG. 5 is a graphic representation showing a relation between the relative permeability of a magnetic thin film and the thickness of each iron carbide layer while the thickness of each iron layer remains unchanged.

FIGS. 3, 4 and 5 are graphic representations showing variations in the saturation magnetic flux density, coercive force and relative permeability at 20 MHz, respectively, of iron carbide plus iron multi-layer thin films on condition that the iron carbide layers are varied in thickness from 0.7 to 2000 nm while the iron layers have a constant thickness of 3 nm. The iron carbide layers contain 24 mole % of carbon as will have a magnetostriction constant of $5.2 \times 10^{-6}$ if formed in a single layer.

As apparent from FIGS. 3, 4 and 5, the combination of the iron layers each of 3 nm thickness and the iron carbide layers containing 24 mole % of carbon constitutes a magnetic thin film which has improved magnetic properties particularly when the thickness of each iron carbide layer is 3 to 800 nm.

Figure 6:
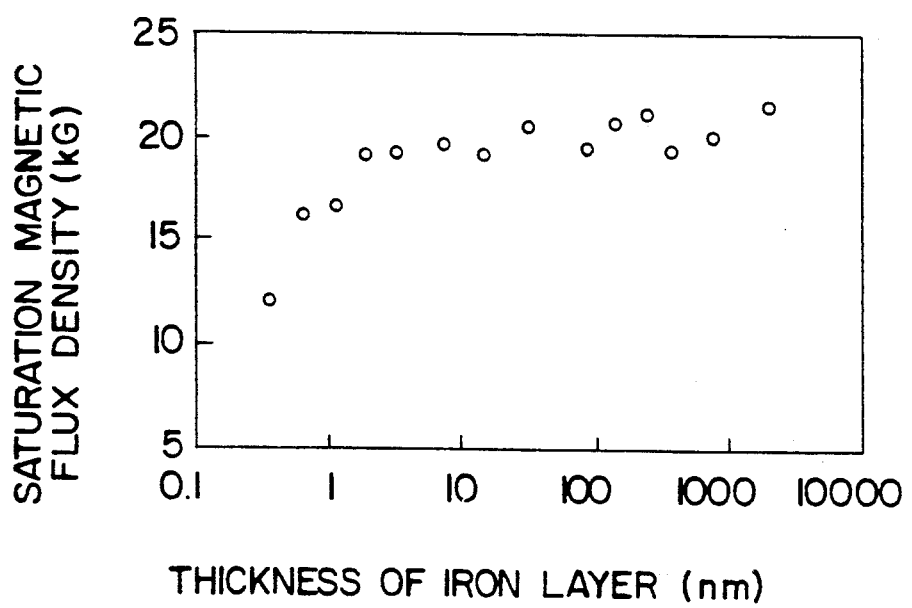
FIG. 6 is a graphic representation showing a relation between the saturation magnetic flux density of a magnetic thin film and the thickness of each iron layer while the thickness of each iron carbide layer remains unchanged.
Figure 7:
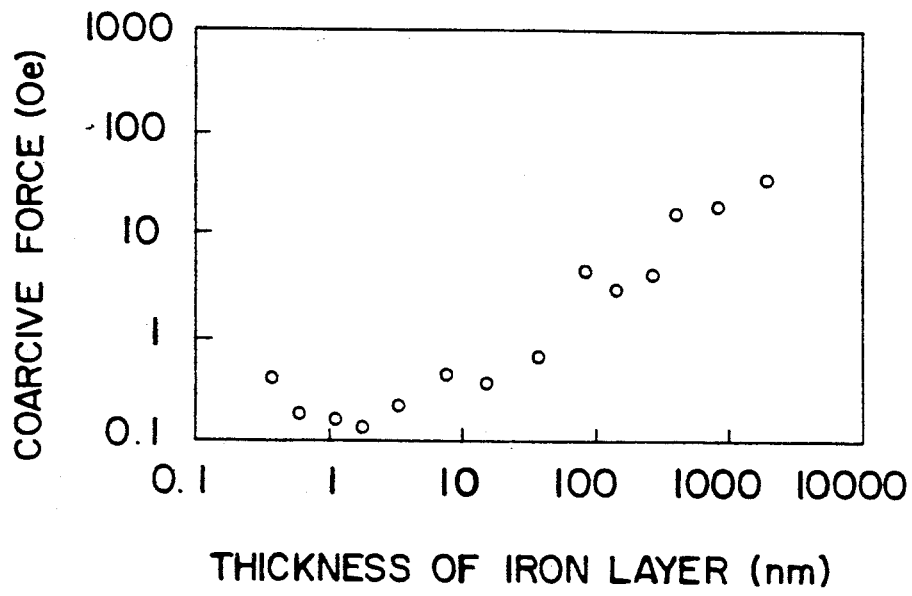
FIG. 7 is a graphic representation showing a relation between the coercive force of a magnetic thin film and the thickness of each iron layer while the thickness of each iron carbide layer remains unchanged.
Figure 8:
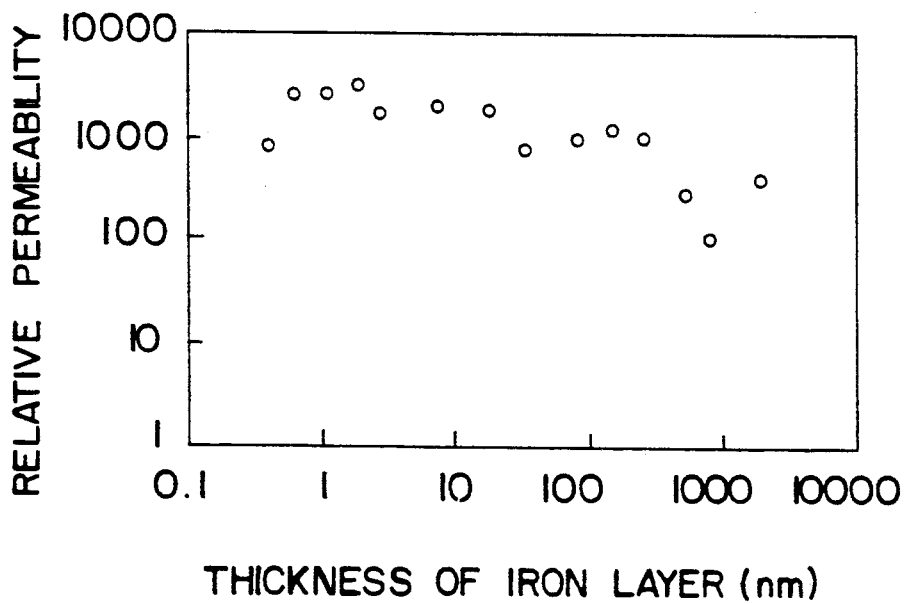
FIG. 8 is graphic representation showing a relation between the relative permeability of a magnetic thin film at 20 MHz and the thickness of each iron layer while the thickness of each iron carbide layer remains unchanged.

FIGS. 6, 7 and 8 are graphic representations showing variations in the saturation magnetic flux density, coercive force and relative permeability at 20 MHz, respectively, of iron carbide plus iron multi-layer thin films on condition that the iron layers are varied in thickness from 0.5 to 2000 nm while the iron carbide layers have a constant thickness of 30 nm. The iron carbide layers contain 24 mole % of carbon as will have a magnetostriction constant of $5.2 \times 10^{-6}$ if formed in a single layer.

As apparent from FIGS. 6, 7 and 8, the combination of the iron layers and the iron carbide layers each of 30 nm thickness containing 24 mole % of carbon constitutes a magnetic thin film which has improved magnetic properties particularly when the thickness of each iron layer is 0.5 to 60 nm.

Figure 9:
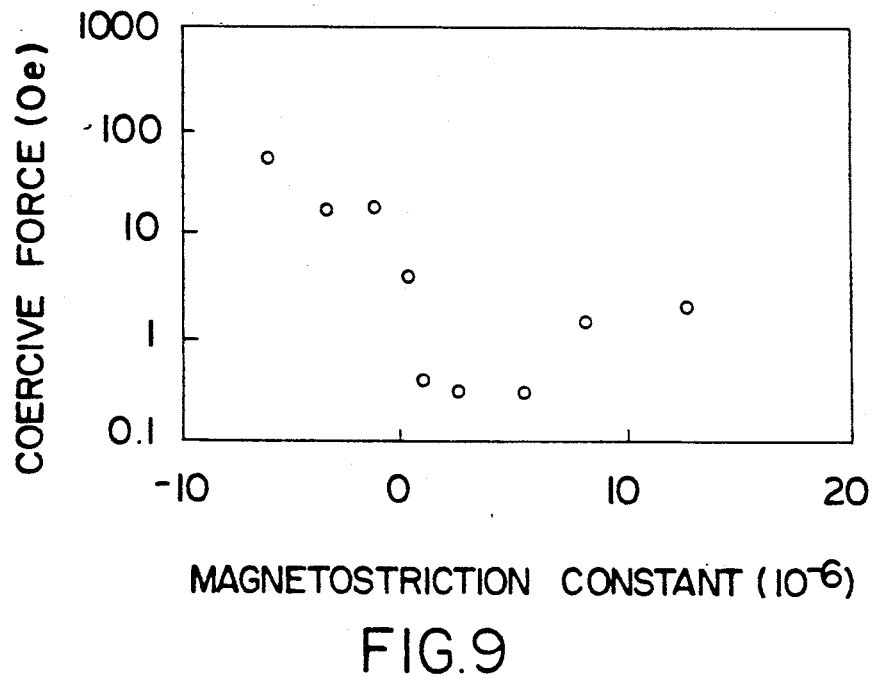
FIG. 9 is a graphic representation showing a relation of the coercive force of a multi-layer magnetic film comprising 100 nm thick iron carbide layers and 3 nm thick iron layers to the magnetrostriction constant of a 100 nm thick single-layer iron carbide film when the carbon density is varied.
Figure 10:
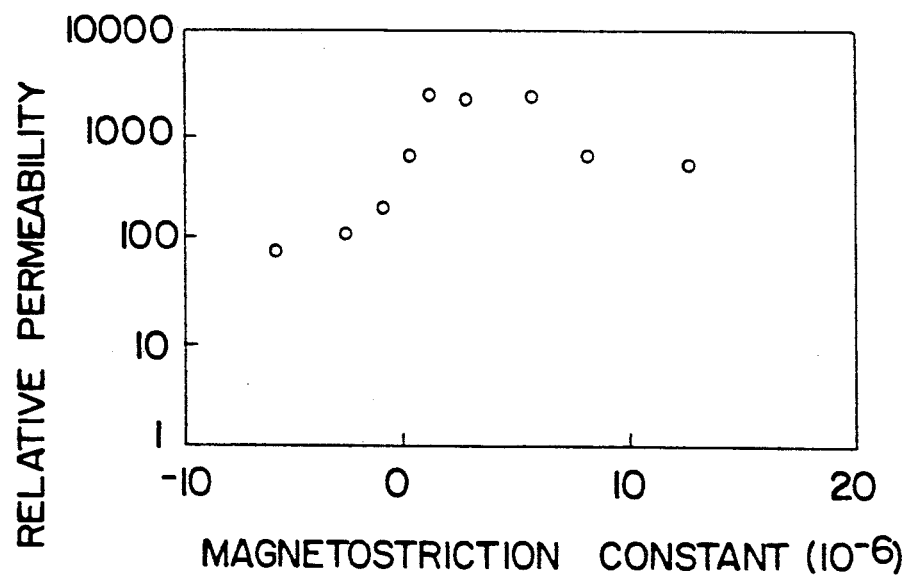
FIG. 10 is a graphic representation showing a relation of the relative permeability of a multi-layer magnetic film comprising 100 nm thick iron carbide layers and 3 nm thick iron layers to the magnetostriction constant of a 100 nm thick single-layer iron carbide film when the carbon density is varied.

FIGS. 9 and 10 are graphic representations showing the relations of the magnetostriction constant of iron carbide single-layer films of 100 nm thickness which are varied in the carbon density with the coercive force and relative permeability of multi-layer films of 3 nm thick iron layers and the same 100 nm thick iron carbon layers as the single-layer films.

As apparent from FIGS. 9 and 10, the combination of the iron layers each of 3 nm thickness and the iron carbide layers each of 100 nm thickness constitutes a magnetic thin film which has improved magnetic properties particularly when the magnetostriction constant of each iron carbide layer is a positive number, more specifically $0.5 \times 10^{-6}$ to $8.0 \times 10^{-6}$.

Figure 11:
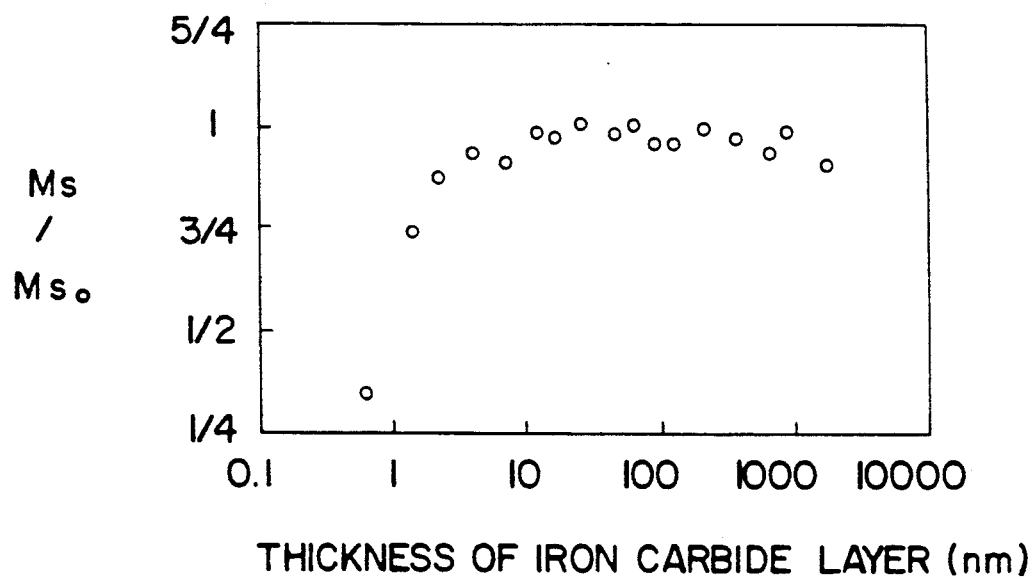
FIG. 11 is a graphic representation showing a ratio of the saturated magnetic flux densities between before and after exposure of a magnetic thin film, to a 3% salt water mist for 200 hours when the thickness of each iron carbide layer is varied while the thickness of each iron layer remains unchanged.

FIG. 11 is a graphic representation showing variations of the saturation magnetic flux density multi-layer films of laminated iron carbide layers and iron layers expressed in a ratio between before and after exposure of the films to a 3% salt water vapor for 200 hours. The multi-layer films each comprise iron layers each of which has a constant thickness of 3 nm, and iron carbide layers each of which is varied in thickness from 0.7 to 2000 nm and contains 24 mole of carbon as will have a magnetostriction constant of $5.2 \times 10^{-6}$ formed in a single layer.

As apparent from FIG. 11, the combination of the iron layers each of 3 nm thickness and the iron carbide layers containing 24 mole % of carbon constitutes a magnetic thin film which can provide improved atmospheric durability particularly when the thickness of each iron carbide layer is 3 nm or more.

Accordingly, the soft-magnetic thin film of iron layers and iron carbide layers which are laminated alternately can equally be improved in the atmospheric durability, the relative permeability and the saturation magnetic flux density by adjusting the thickness of each iron layer to 0.5 to 60 nm and the thickness of each iron carbide layer, which has a carbon density providing a positive value of magnetostriction constant, to 3 to 800 nm.

EXAMPLE 3

Various multi-layer films were produced with the apparatus shown in FIG. 40, each consisting of iron nitride layers and iron carbide layers and being different from the other in layer thickness or nitrogen or carbon density.

Table 2 shows the comparison of a soft-magnetic thin film according to the present invention with single-layer films of iron nitride and of iron carbide respectively in respect of magnetic properties. The soft-magnetic thin film comprises alternately laminated iron nitride layers each of which has a thickness of 5 nm and contains 22 mole % of nitrogen and iron carbide layers each of which has a thickness of 60 nm and contains 12 mole % of carbon. The iron nitride single-layer film contains 16 mole % of nitrogen. One of the iron carbide single-layer films contains 12 mole % of carbon while the other contains 25 mole % of carbon.

As shown in Table 2, the relative permeability was measured at 20 MHz, and the durability was represented by a ratio of saturation magnetic flux densities between after and before exposure of the films to a 3% salt water vapor for 200 hours.

TABLE 2

| | This invention | Iron nitride | Iron carbide | Iron carbide |
|---|---|---|---|---|
| Carbon density (mole %) | Ferrous carbide layer 12 | 0 | 12 | 25 |
| Saturation magnetization kG | 18.7 | 13.3 | 19.4 | 16.2 |
| Coercive force Öe | 0.24 | 32.4 | 2.2 | 7.6 |
| Relative permeability μ | 4100 | 750 | 2000 | 2100 |
| Atmospheric durability | 1.01 | 0.99 | 0.67 | 0.81 |

It is apparent from Table 2 that the soft-magnetic thin film of iron carbide layers and iron nitride layers which are laminated alternately is high in all of the saturation magnetic flux density, relative permeability, and atmospheric durability, as compared with the single-layer films.

EXAMPLE 4

Table 3 shows the magnetic properties. and atmospheric durability of soft-magnetic thin films each comprising iron nitride layers each of which has a thickness of 5 nm, and iron carbide layers each of which has a thickness of 60 nm and contains 12 mole % of carbon, while the nitrogen density of the iron nitride layers is varied from 4.7 mole % to 22.0 mole %.

In Table 3, the durability is represented by a ratio of saturation magnetic flux densities between after and before exposure of the films to a 3% salt water vapor for 200 hours.

TABLE 3

| Crystalline structure | α Fe | Fe₄N α Fe | Fe₄N Fe₃N | Fe₄N |
|---|---|---|---|---|
| Carbon density (mole %) | 4.7 | 10.1 | 16.4 | 22.0 |
| Saturation magnetization kG | 21.1 | 19.2 | 18.7 | 14.9 |
| Coercive force Öe | 8.8 | 0.12 | 0.24 | 12.2 |
| Atmospheric durability | 0.64 | 0.99 | 1.01 | 0.81 |

As apparent from Table 3, the multi-layer thin film of 5 nm thick iron nitride layers and 60 nm thick iron carbide layers containing 12 mole % of carbon constitutes a magnetic thin film which has improved magnetic properties particularly when the iron nitride layer is mainly composed of γFe₄N in a crystalline structure.

Figure 12:
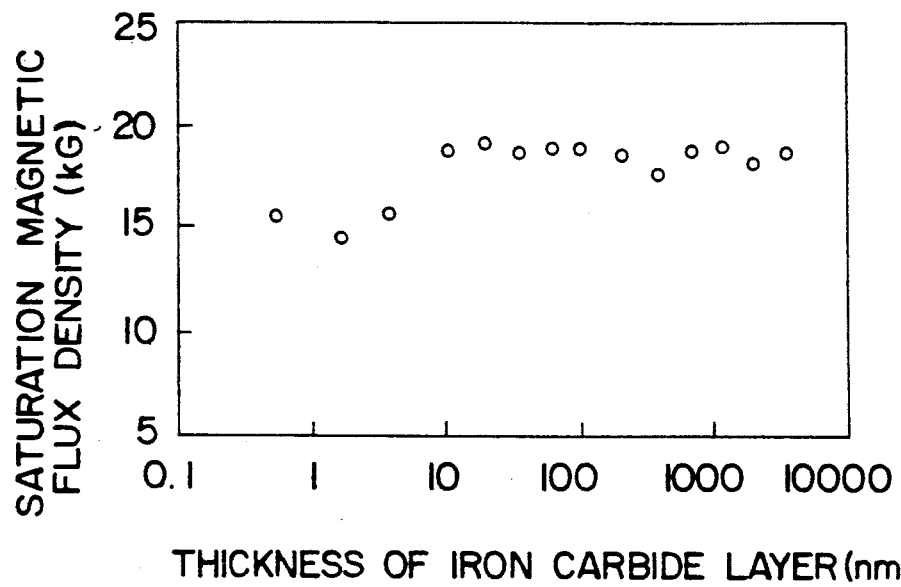
FIG. 12 is a graphic representation showing a relation between the saturation magnetic flux density of a magnetic thin film and the thickness of each iron carbide layer while the thickness of each iron nitride layer remains unchanged.
Figure 13:
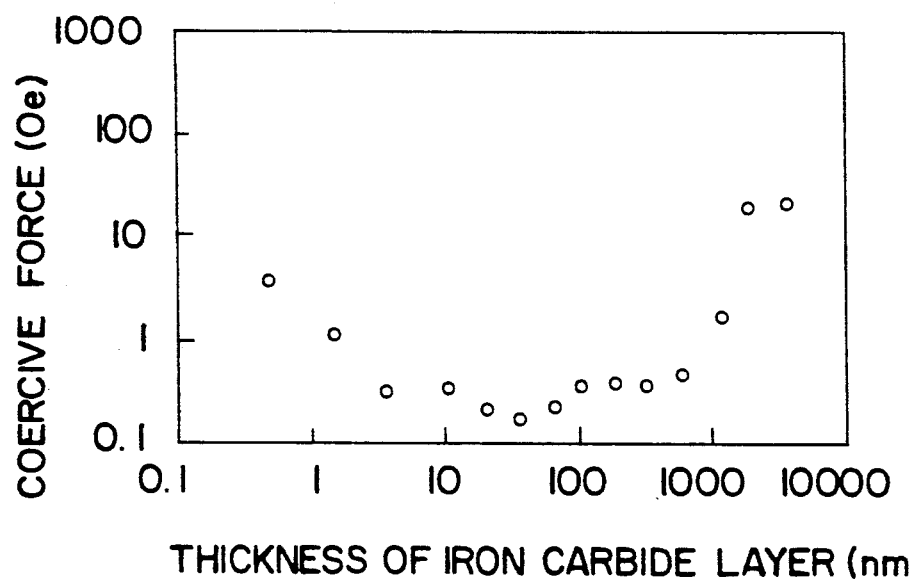
FIG. 13 is a graphic representation showing a relation between the coercive force of a magnetic thin film and the thickness of each iron carbide layer while the thickness of each iron nitride layer remains unchanged.
Figure 14:
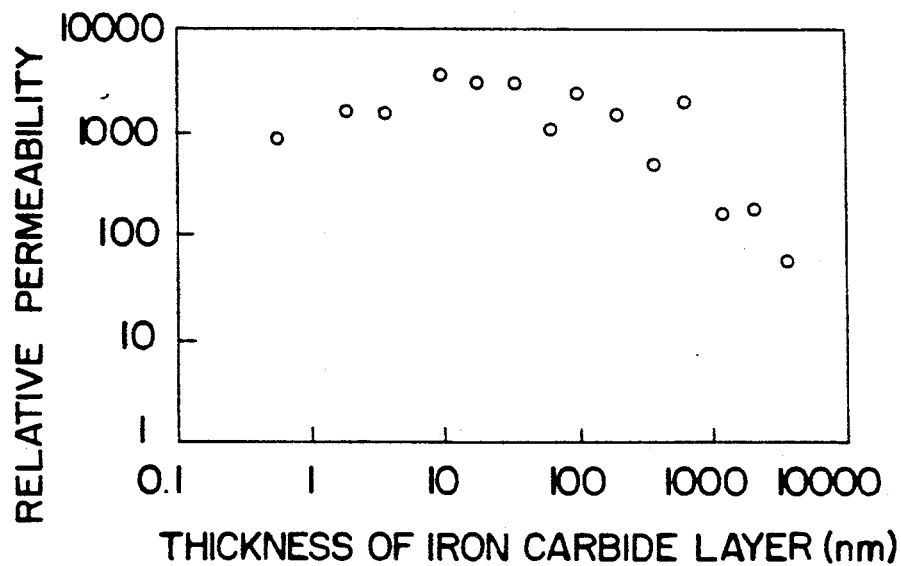
FIG. 14 is a graphic representation showing a relation between the relative permeability of a magnetic thin film and the thickness of each iron carbide layer while the thickness of each iron nitride layer remains unchanged.

FIGS. 12, 13 and 14 are graphic representations showing variations in the saturation magnetic flux density, coercive force and relative permeability at 20 MHz, respectively, of iron carbide-iron nitride multi-layer thin films on condition that the iron carbide layers are varied in thickness from 0.7 to 5000 nm while the iron nitride layers have a constant thickness of 5 nm. The iron nitride layer is mainly composed of ΓFe₄N in a crystalline structure and the iron carbide layer contains 12 mole % of carbon.

As apparent from FIG. 12, 13 and 14, the multi-layer thin film of 5 nm thick iron nitride layers composed mainly of γFe₄N and iron carbide layers containing 12 mole % of carbon constitutes a magnetic thin film which has improved magnetic properties particularly when the thickness of each iron carbide layer is in a range from 2 nm to 1100 nm.

Figure 15:
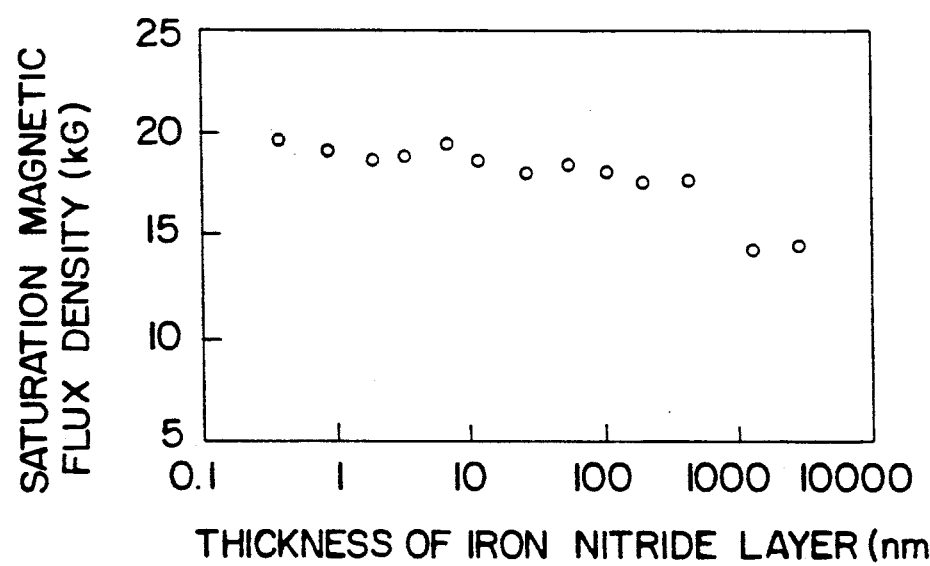
FIG. 15 is a graphic representation showing a relation between the saturation magnetic flux density of a magnetic thin film and the thickness of each iron nitride layer while the thickness of each iron carbide layer remains unchanged.
Figure 16:
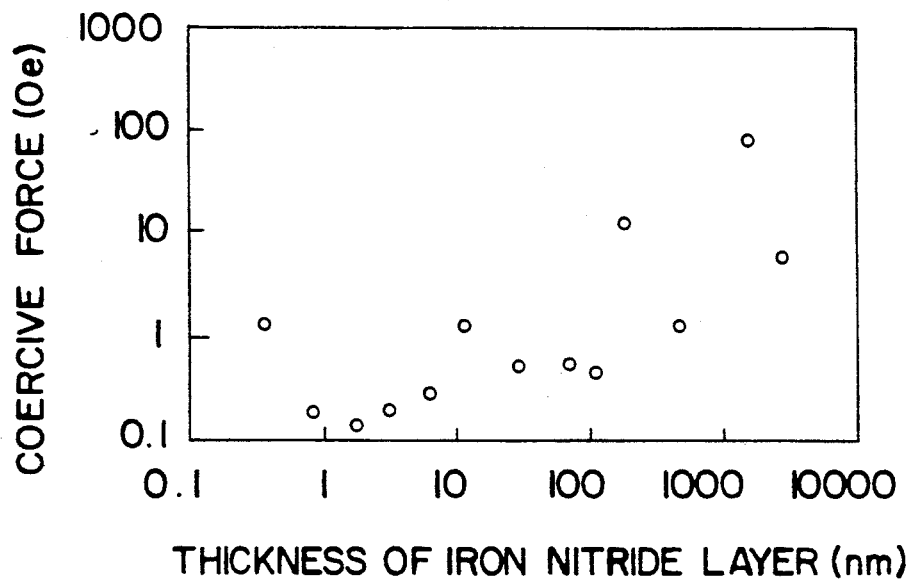
FIG. 16 is a graphic representation showing a relation between the coercive force of a magnetic thin film and the thickness of each iron nitride layer while the thickness of each iron carbide layer remains unchanged.
Figure 17:
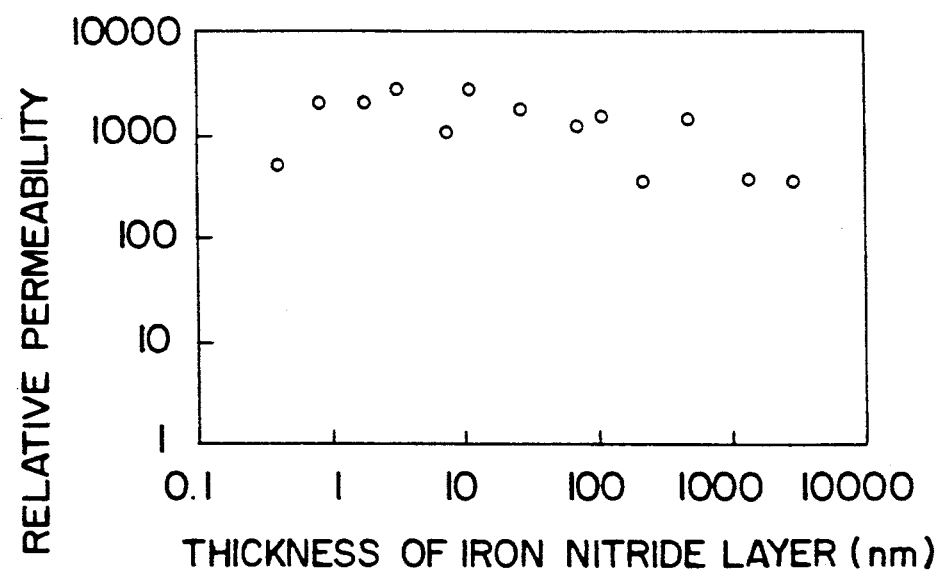
FIG. 17 is a graphic representation showing a relation between the relative permeability of a magnetic thin film at 20 MHz and the thickness of each iron nitride layer while the thickness of each iron carbide layer remains unchanged.

FIGS. 15, 16 and 17 are graphic representations showing variations in the saturation magnetic flux density, coercive force and relative permeability at 20 MHz, respectively, of iron carbide-iron nitride multi-layer thin films on condition that the iron nitride layers are varied in thickness from 0.5 to 4000 nm while the iron carbide layers have a constant thickness of 60 nm. Each iron nitride layer is mainly composed of γFe₄N in a crystalline structure and each iron carbide layer contains 12 mole % of carbon.

As apparent from FIGS. 15, 16 and 17, the multi-layer thin film of 60 nm thick iron carbide layers containing 12 mole % of carbon and iron nitride layers composed mainly of γFe₄N, constitutes a magnetic thin film which has improved magnetic properties particularly when the thickness of each iron nitride layer is in a range from 0.5 to 200 nm.

Figure 18:
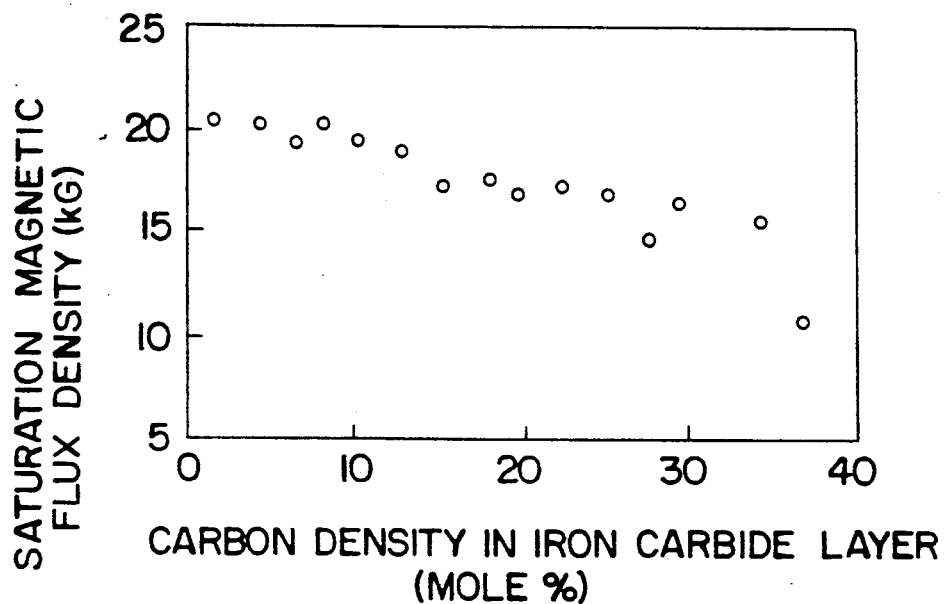
FIG. 18 is a graphic representation showing a relation of the saturation magnetic flux density of a multi-layer magnetic thin film comprising 60 nm thick iron carbide layers and 5 nm thick iron nitride layers to the carbon density of the iron carbide layers which is varied.
Figure 19:
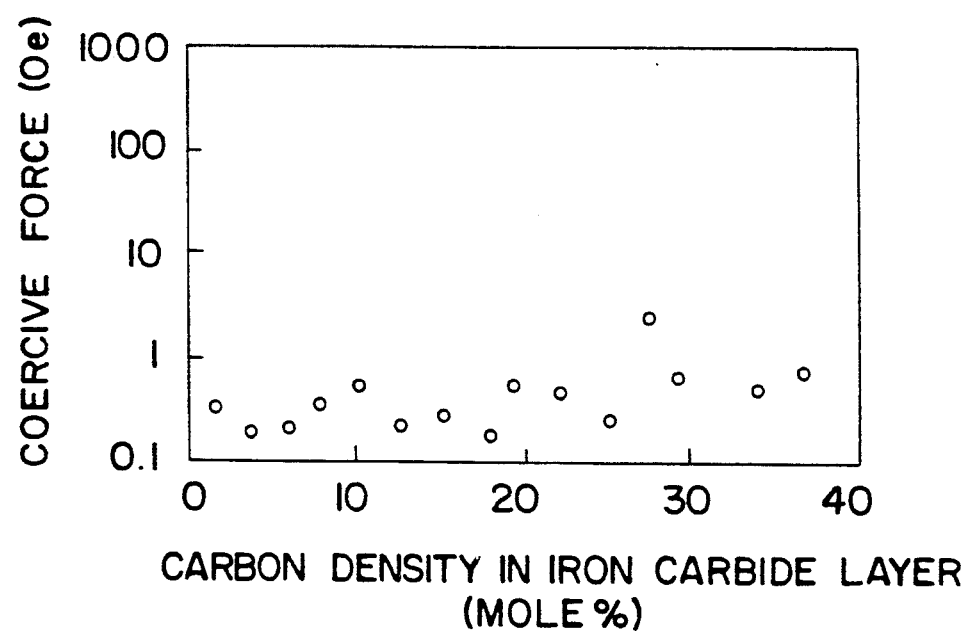
FIG. 19 is a graphic representation showing a relation of the coercive force of a magnetic thin film comprising 60 nm thick iron carbide layers and 5 nm thick iron nitride layers to the carbon density of the iron carbide layers which is varied.
Figure 20:
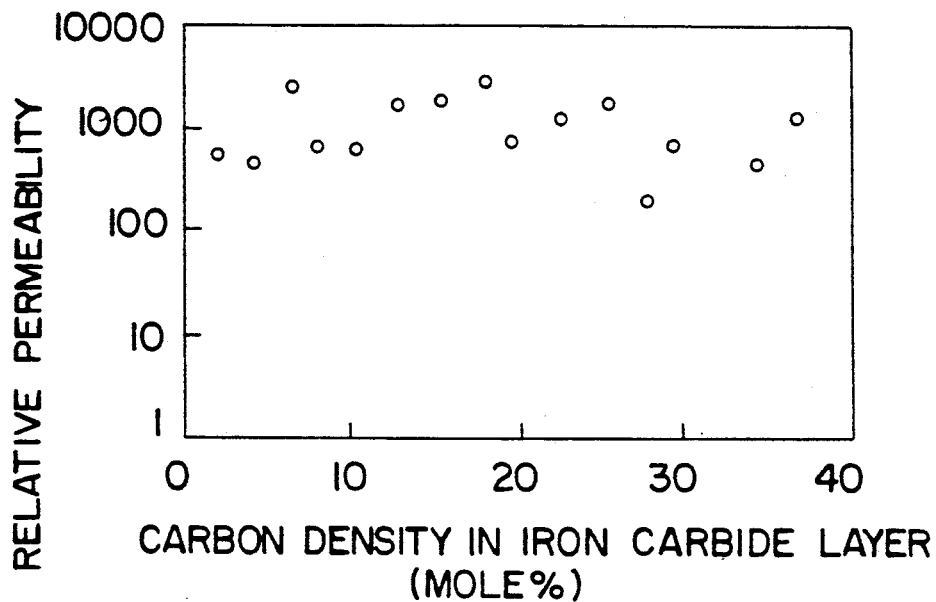
FIG. 20 is graphic representation showing a relation of the relative permeability of a magnetic thin film comprising 60 nm thick iron carbide layers and 5 nm thick iron nitride layers to the carbon density of the iron carbide layers which is varied.

FIGS. 18, 19 and 20 are graphic representations showing variations in the saturation magnetic flux density, coercive force and relative permeability at 20 MHz, respectively, of iron carbide-iron nitride multi-layer thin films on condition that the carbon density of the iron carbide layers is varied from 1.5 mole % to 37 mole % while the thickness of 60 nm of each thereof remains unchanged and that each of the iron nitride layers composed mainly of γFe₄N is 5 nm in thickness.

As apparent from FIGS. 18, 19 and 20, multi-layer thin film of 60 nm thick iron carbide layers and 5 nm thick iron nitride layers composed mainly of γFe₄N, constitutes a magnetic thin film which has improved soft-magnetic properties particularly when the carbon density of the iron carbide layer is in a range from 4 mole % to 29 mole %.

Figure 21:
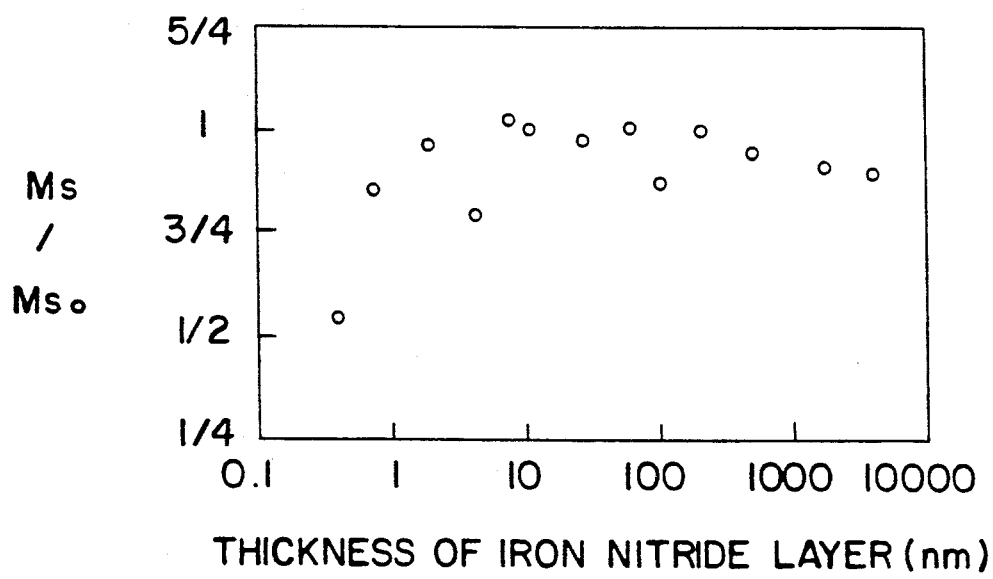
FIG. 21 is a graphic representation showing a relation between the thickness of each iron nitride layer which is varied in a magnetic thin film and the ratio of saturation magnetic flux densities between before and after exposure of the thin film to a 3% salt water mist for 200 hours which the thickness of each iron carbide layer remains unchanged.

FIG. 21 is a graphic representation showing the saturation magnetic flux density of multi-layer thin films expressed in a ratio between before and after exposure of the thin films to a 3% salt water vapor for 200 hours. The thin films comprise iron carbide layers each of which has a constant thickness of 5 nm and contains 12 mole % of carbon and iron nitride layers each of which is mainly composed of $\gamma Fe_4N$ and varied in thickness from 0.5 to 4000 nm.

As apparent from FIG. 21, the multi-layer thin film of 5 nm thick iron carbide layers containing 12 mole % of carbon and iron nitride layers composed mainly of $\gamma Fe_4N$, constitutes a magnetic thin film which can provide improved atmospheric durability particularly when the thickness of each iron nitride layer is 3 nm or more.

Figure 22:
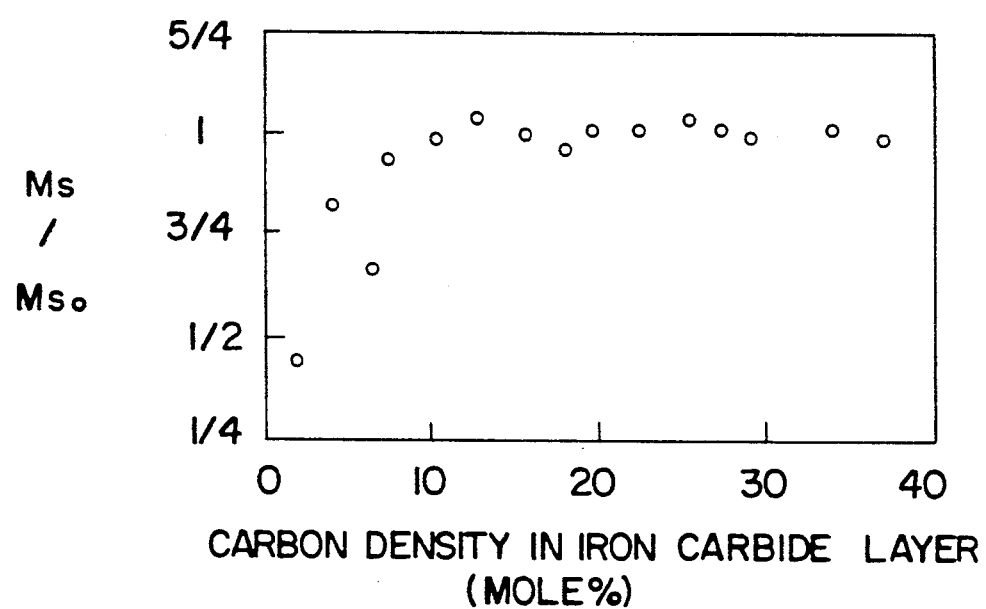
FIG. 22 is a graphic representation showing a relation between the carbon density of iron carbide layers which is varied in a magnetic thin film and the ratio of saturation magnetic flux densities between before and after exposure of the thin film to a 3% salt water mist for 200 hours.

FIG. 22 is a graphic representation showing the saturation magnetic flux density of multi-layer thin films expressed in a ratio between before and after exposure of the films to a 3% salt water vapor for 200 hours. The thin films comprise iron nitride layers each of which has a constant thickness of 5 nm and is composed mainly of $\gamma Fe_4N$, and iron carbide layers each of which has a thickness of 60 nm and contains carbon from 1.5 mole % to 37 mole %.

As apparent from FIG. 22, the multi-layer thin film of 60 nm thick iron carbide layers and iron nitride layers composed mainly of $\gamma Fe_4N$, constitutes a magnetic thin film which can provide improved atmospheric durability particularly when each of the iron carbide layers contains at least 10 mole % of carbon.

Accordingly, the soft-magnetic thin film of iron carbide layers and iron nitride layers laminated alternately can be improved in all of the atmospheric durability, the relative permeability and the saturation magnetic flux density by adjusting the thickness of each iron carbide layer, which contains 4 to 35 mole % of carbon, to 3 to 1000 nm and the thickness of each iron nitride layer, which is mainly composed of $\gamma Fe_4N$, to 0.6 to 200 nm.

EXAMPLE 5

Various multi-layer thin films were produced with the apparatus shown in FIG. 40, composed mainly of iron carbide layers and iron carbon-nitride layers, each of which is different from the others in thickness or carbon or nitrogen density.

Table 4 shows the comparison of a soft-magnetic thin film according to the present invention with single-layer films of iron carbon-nitride and of iron carbide respectively in respect of magnetic properties. The soft-magnetic thin film of the invention comprises iron carbide layers each of which has a thickness of 25 nm and contains 17 mole % of carbon and iron carbon-nitride layers each of which has a thickness of 20 nm and contains 4 mole % of nitrogen. The iron carbon-nitride single-layer film contains 17 mole % of carbon and 5.5 mole % of nitrogen. One of the iron carbide single-layer films (referred to as iron carbide 1) contains 17 mole % of carbon while the other (referred to as iron carbide 2) contains 24 mole % of carbon.

As shown in Table 4, the relative permeability was measured at 20 MHz, and the atmospheric durability was represented by a ratio of saturation magnetic flux densities between after and before exposure of the films to a 3 % salt water vapor for 200 hours.

TABLE 4

|  | This invention | Iron carbon-nitride | Iron carbide 1 | Iron carbide 2 |
| --- | --- | --- | --- | --- |
| Thickness of layer (μm) | 2.25 | 2.31 | 2.17 | 2.18 |
| Saturation magnetization kG | 18.8 | 15.5 | 19.1 | 12.4 |
| Coercive force Öe | 0.17 | 24.6 | 3.1 | 3.4 |
| Relative permeability μ | 3800 | 720 | 1900 | 780 |
| Atmospheric durability | 0.99 | 0.99 | 0.72 | 1.10 |

It is apparent from Table 4 that the soft-magnetic thin film of iron carbide layers and iron carbon-nitride layers laminated alternately is high in all of the saturation magnetic flux density, relative permeability and atmospheric durability, as compared with the single-layer films.

EXAMPLE 6

Figure 23:
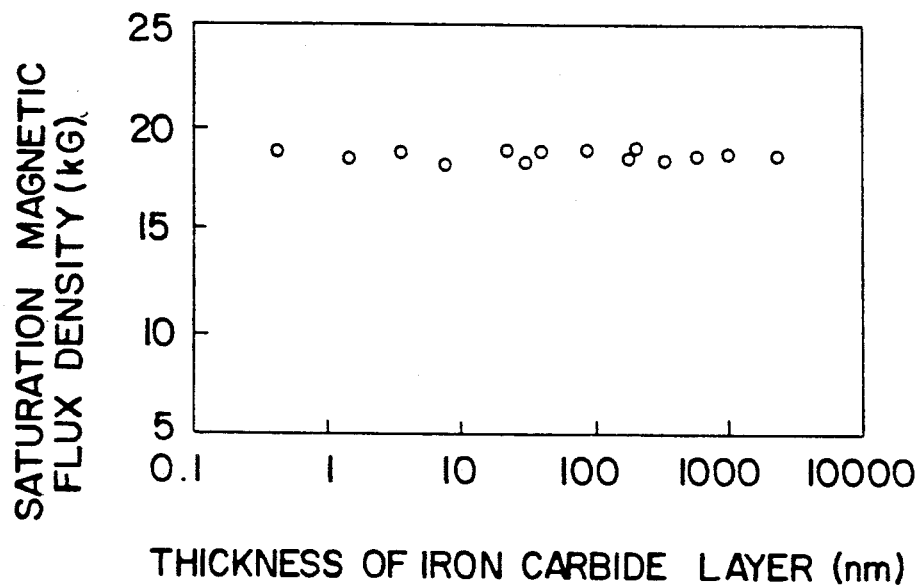
FIG. 23 is a graphic representation showing a relation between the saturation magnetic flux density of a magnetic thin film and the thickness of each iron carbide layer while the thickness of each iron carbon-nitride layer remains unchanged.
Figure 24:
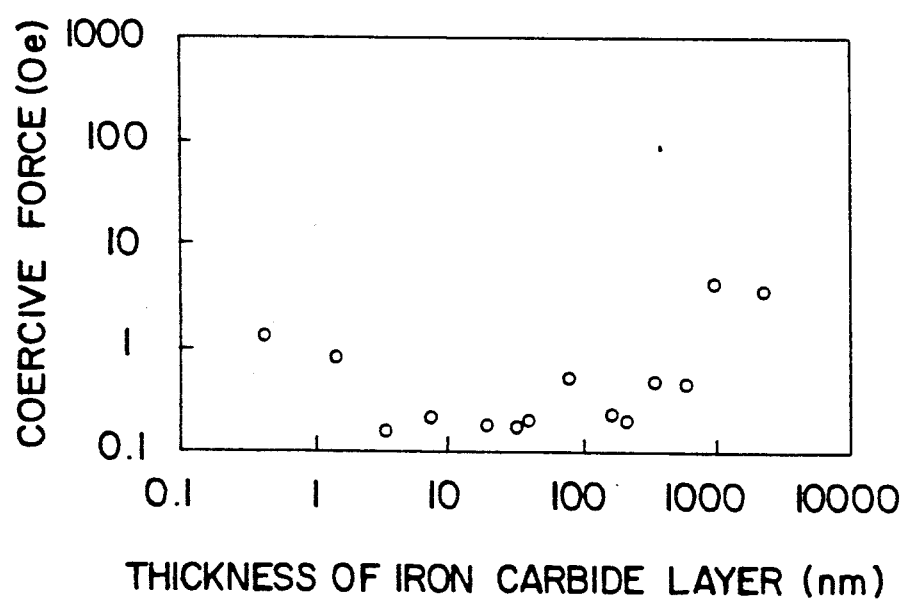
FIG. 24 is a graphic representation showing a relation between the coercive force of a magnetic thin film and the thickness of each iron carbide layer while the thickness of each iron carbon-nitride layer remains unchanged.
Figure 25:
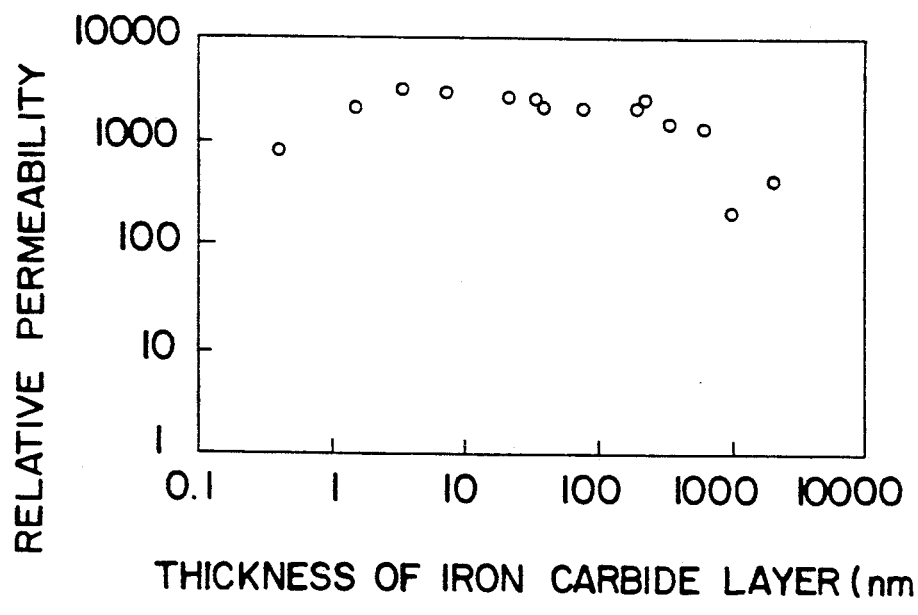
FIG. 25 is a graphic representation showing a relation between the relative permeability of a magnetic thin film and the thickness of each iron carbide layer while the thickness of each iron carbon-nitride layer remains unchanged.

FIGS. 23, 24 and 25 are graphic representations showing variations in the saturation magnetic flux density, coercive force and relative permeability at 20 MHz, respectively, of iron carbide-iron carbon-nitride multi-layer thin films on condition that the iron carbide layers are varied in thickness from 0.6 to 3000 nm while the iron carbon-nitride layers have a constant thickness of 25 mn. Each iron carbide layer contains 17 % mole of carbon and each iron carbon-nitride layer contains 16 mole % of carbon and 5.5 mole % of nitrogen.

As apparent from FIGS. 23, 24 and 25, the multi-layer thin film of iron carbide layers containing 17 mole % of carbon and 25 nm thick iron carbon-nitride layers containing 16 mole % of carbon and 5.5 mole % of nitrogen, constitutes a magnetic thin film which has improved soft-magnetic properties particularly when the thickness of each iron carbide layer is in a range from 0.6 nm to 1000 nm.

Figure 26:
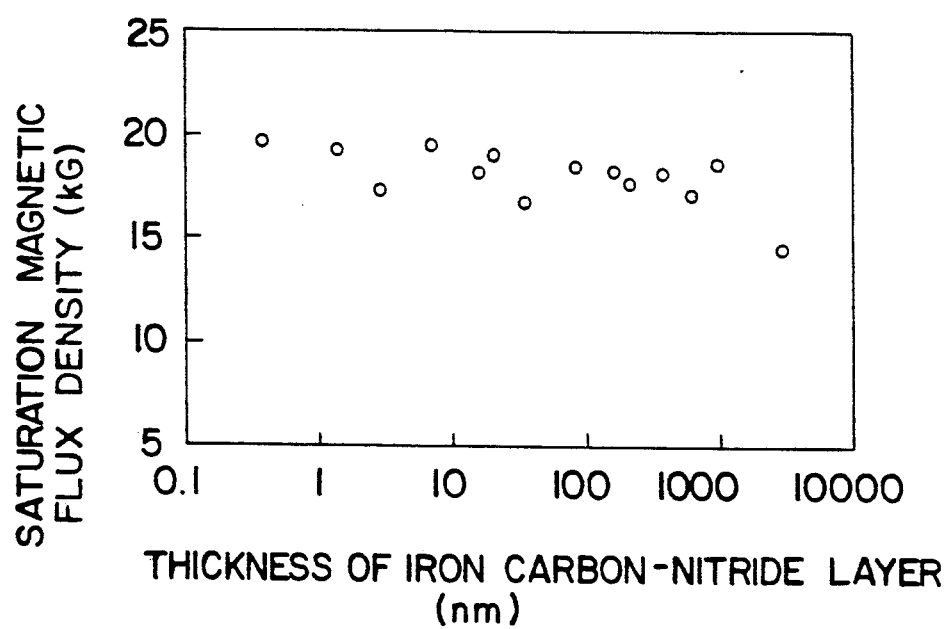
FIG. 26 is a graphic representation showing a relation between the saturation magnetic flux density of a magnetic thin film and the thickness of each iron carbon-nitride layer while the thickness of each iron carbide layer remains unchanged.
Figure 27:
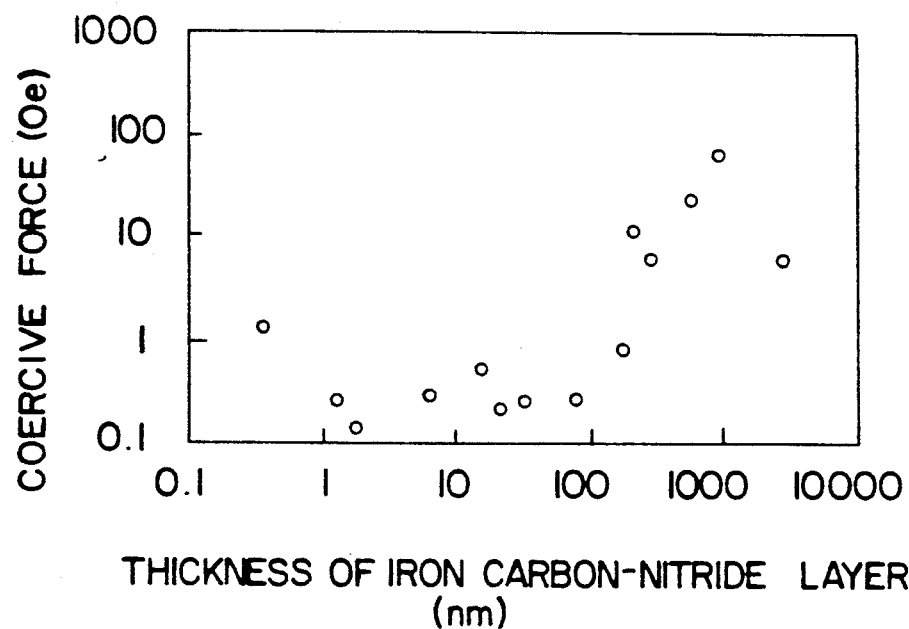
FIG. 27 is a graphic representation showing a relation between the coercive force of a magnetic thin film and the thickness of each iron carbon-nitride layer while the thickness of each iron carbide layer remains unchanged.
Figure 28:
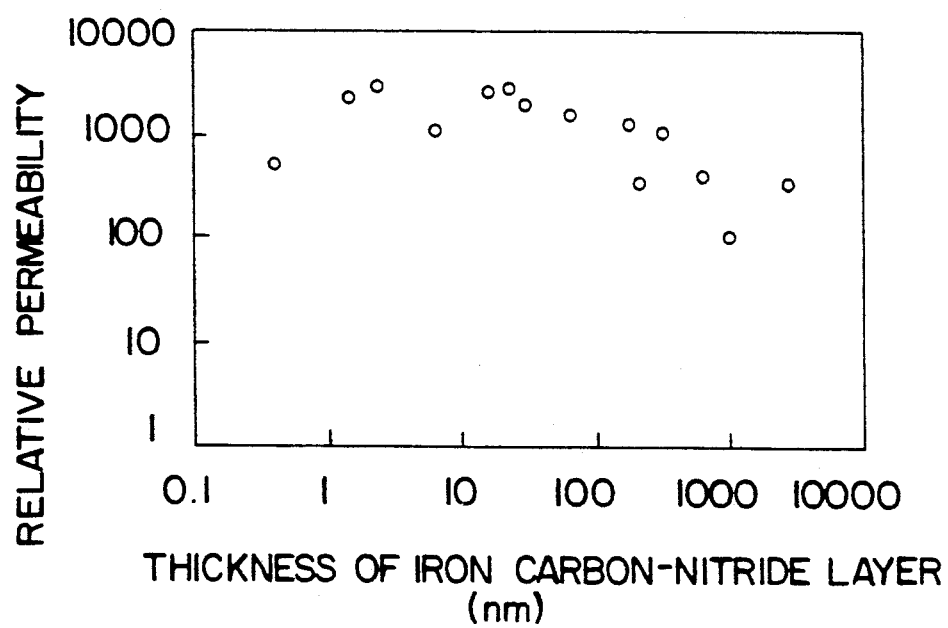
FIG. 28 is a graphic representation showing a relation between the relative permeability of a magnetic thin film at 20 MHz and the thickness of each iron carbon-nitride layer while the thickness of each iron carbide layer remains unchanged.

FIGS. 26, 27 and 28 are graphic representations showing variations in the saturation magnetic flux density, coercive force and relative permeability at 20 MHz, respectively, of iron carbide-iron carbon-nitride multi-layer thin films on condition that each of the iron carbon-nitride layer is varied in thickness from 0.5 to 3500 nm while each of the iron carbide layer has a constant thickness of 20 nm. Each iron carbon-nitride layer contains 16 mole % of carbon and 5.5 mole % of nitrogen and each iron carbide layer contains 17 mole % of carbon.

As apparent from FIGS. 26, 27, 28, the multi-layer thin film of 20 nm thick iron carbide layers containing 17 mole % of carbon and iron carbon-nitride layers containing 16 mole % of carbon and 5.5 mole % of nitrogen, constitutes a magnetic thin film which has improved magnetic properties particularly when the thickness of each iron carbon-nitride layer is in a range from 0.6 nm to 300 nm.

Figure 29:
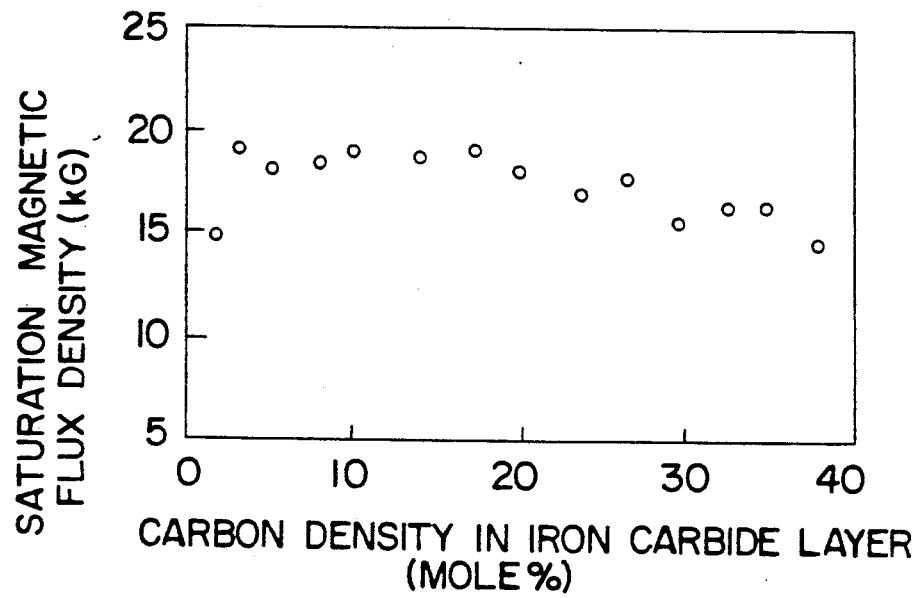
FIG. 29 is a graphic representation showing a relation of the saturation magnetic flux density of a magnetic thin film comprising 25 nm thick iron carbide layers and 20 nm thick iron carbon-nitride layers to the carbon density of the iron carbide layers which is varied.
Figure 30:
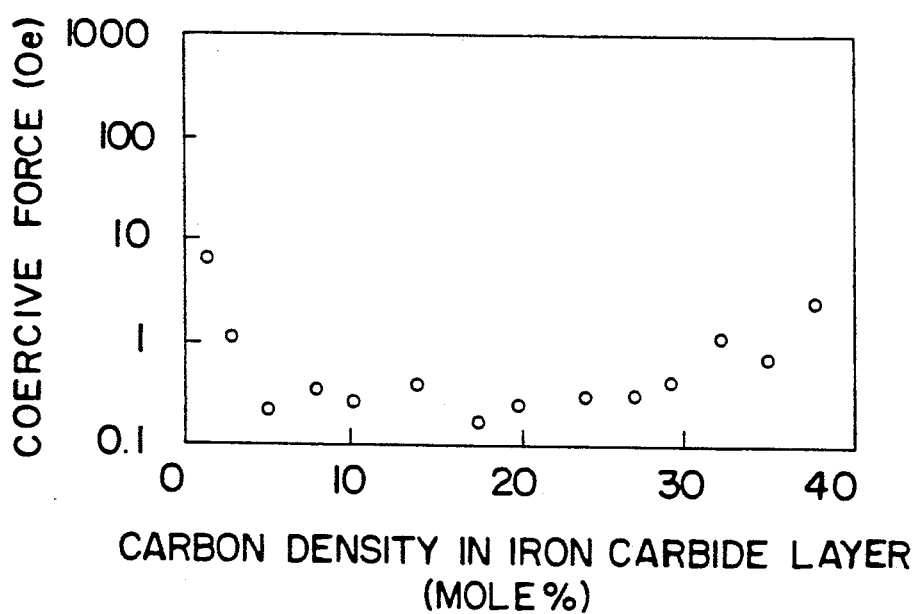
FIG. 30 is a graphic representation showing a relation of the coercive force of a magnetic thin film comprising 25 nm thick iron carbide layers and 20 nm thick iron carbon-nitride layers to the carbon density of the iron carbide layers which is varied.
Figure 31:
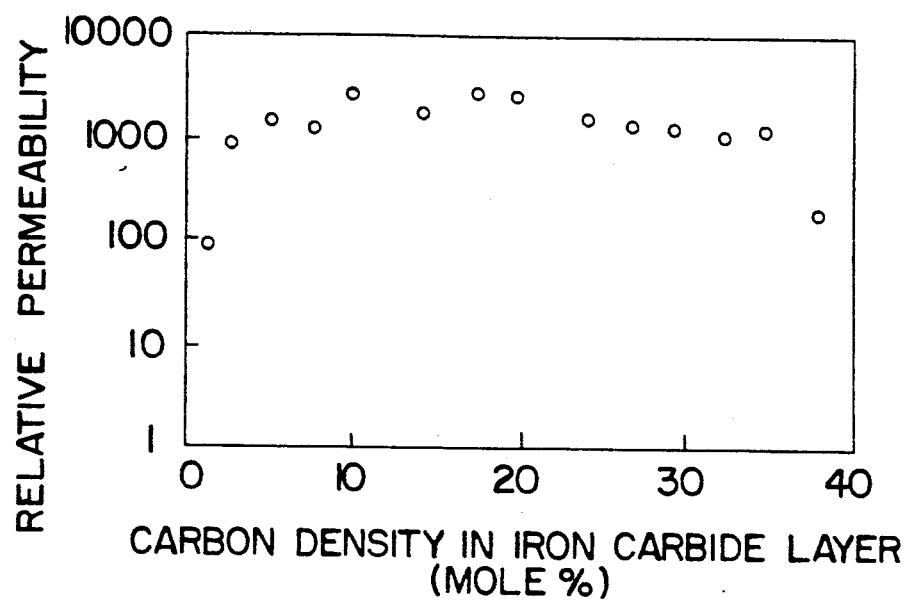
FIG. 31 is a graphic representation showing a relation of the relative permeability of a magnetic thin film comprising 25 nm thick iron carbide layers and 20 nm thick iron carbon-nitride layers to the carbon density of the iron carbide layer which is varied.

FIGS. 29, 30 and 31 are graphic representations showing variations in the saturation magnetic flux density, coercive force, and relative permeability at 20 MHz, respectively, of iron carbide-iron carbon-nitride multi-layer thin films on condition that the carbon density of the iron carbide layers is varied from 1.0 mole % to 38 mole % while the thickness of 25 nm of each thereof remains unchanged and that the iron carbonnitride layers have a constant thickness of 20 nm and contain 16 mole % of carbon and 5.5 mole % of nitrogen.

As apparent from FIGS. 29, 30 and 31, the multilayer thin film of 25 nm thick iron carbide layers and 20 nm thick iron carbon-nitride layers containing 16 mole % of carbon and 5.5 mole % of nitrogen, constitutes a magnetic thin film which has improved soft-magnetic properties particularly when the carbon density of the iron carbide layers is in a range from 3.0 to 35 mole %.

Figure 32:
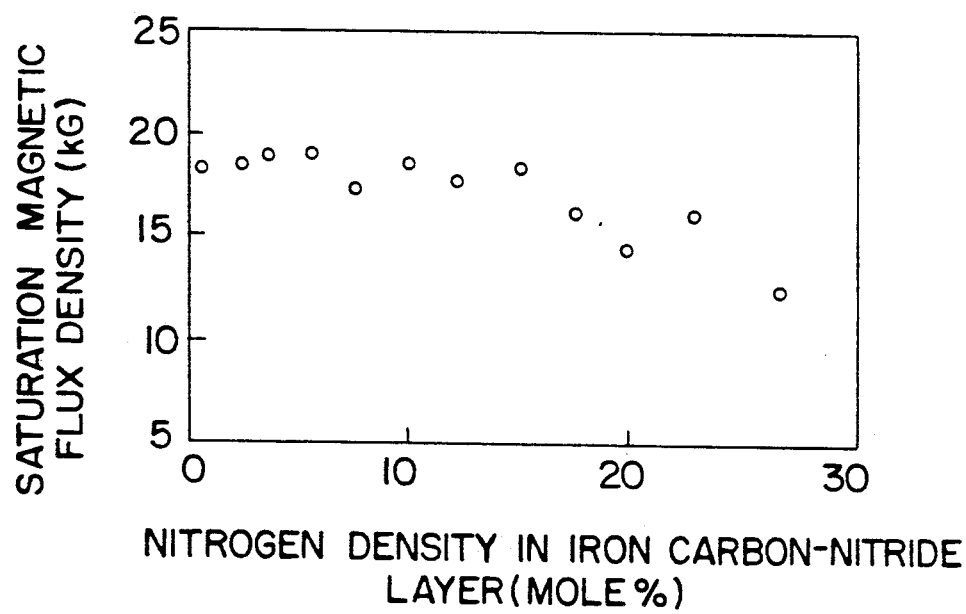
FIG. 32 is a graphic representation showing a relation of the saturation magnetic flux density of a magnetic thin film comprising 25 nm thick irons carbide layers and 20 nm thick iron carbon-nitride layers to the nitrogen density of the iron carbon-nitride layers which is varied.
Figure 33:
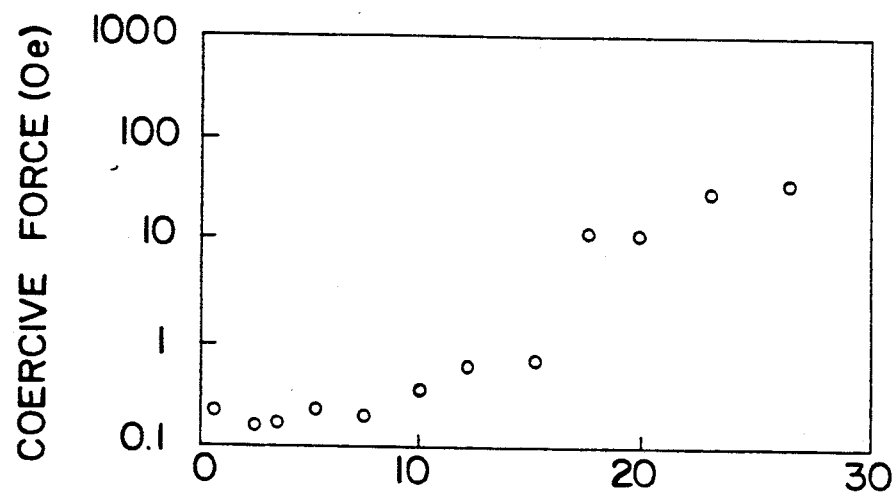
FIG. 33 is a graphic representation showing a relation of the coercive force of a magnetic thin film comprising 25 nm thick iron carbide layers and 20 nm thick iron carbon-nitride layers to the nitrogen density of the iron carbon-nitride layers which is varied.
Figure 34:
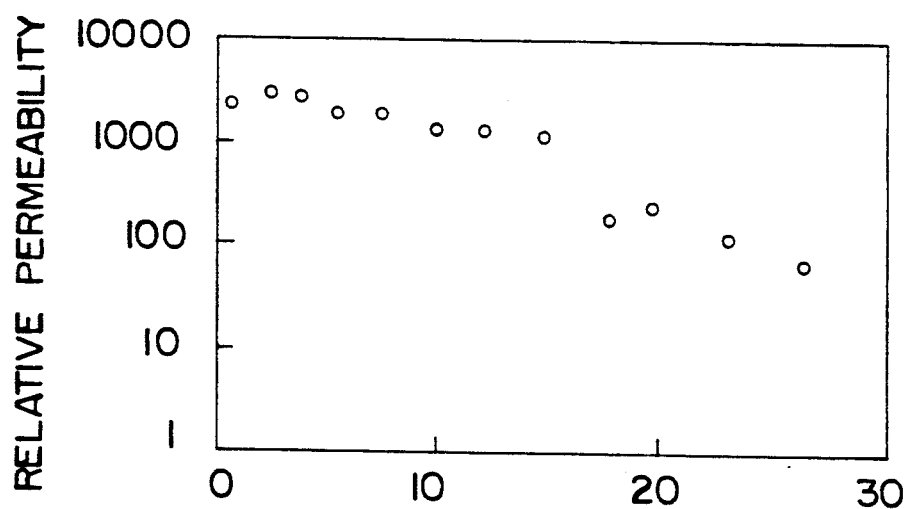
FIG. 34 is a graphic representation showing a relation of the relative permeability of a magnetic thin film comprising 25 nm thick iron carbide layers and 20 nm thick iron carbon-nitride layers to the nitrogen density of the iron carbon-nitride layers which is varied.

FIGS. 32, 33 and 34 are graphic representations showing variations in the saturation magnetic flux density, coercive force and relative permeability at 20 MHz, respectively, of iron carbide-iron carbon-nitride multi-layer thin films on condition that each iron carbon-nitride layer having a constant thickness of 20 nm and a carbon/nitrogen mole ratio of about 17/83 contains nitrogen from 0.2 mole % to 26 mole % and that each iron carbon layer has a constant thickness of 25 nm and contains 17 mole % of carbon.

As apparent from FIGS. 32, 33 and 34, the multilayer thin film 25 nm thick iron carbide layers containing 17 mole % of carbon and 20 nm thick iron carbonnitride layers containing carbon and nitrogen at a mole ratio of about 17/83, constitutes a magnetic thin film which has improved magnetic properties particularly when the nitrogen density of the iron carbon-nitride layer is in a range from 0.2 to 15 mole %.

Figure 35:
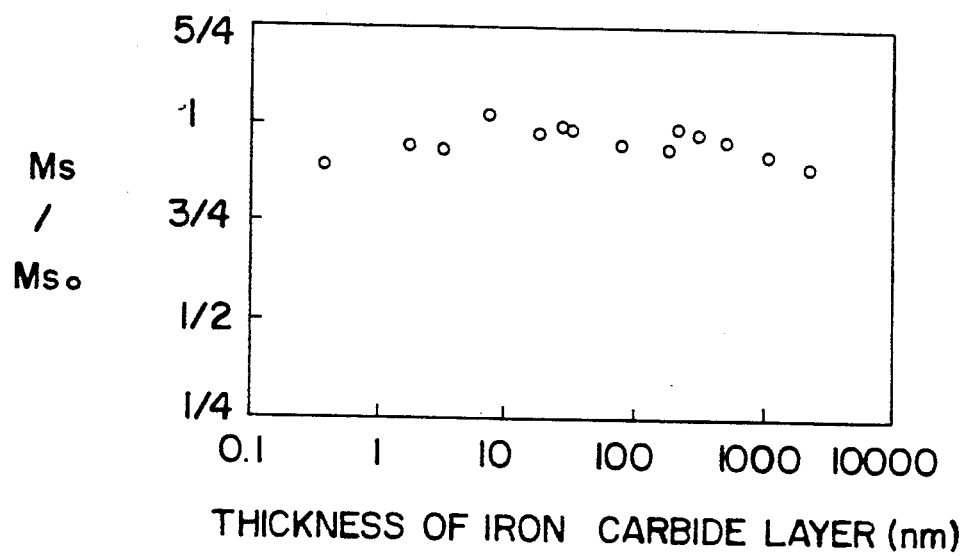
FIG. 35 is a graphic representation showing a relation between the thickness of each iron carbide layer which is varied in a magnetic thin film and the ratio of saturation magnetic flux densities between before and after exposure of the thin film to a 3% salt water mist for 200 hours.

FIG. 35 is a graphic representation showing variations of the saturation magnetic flux density of multilayer thin films comprising iron carbide layers and iron carbon-nitride layers expressed in a ratio between before and after exposure of the films to a 3% salt water vapor for 200 hours, in which each iron carbon-nitride layer containing 16 mole % of carbon and 5.5 mole % of nitrogen is varied in thickness from 0.6 to 3000 nm while each iron carbide layer containing 17 mole % of carbon has a constant thickness of 25 nm.

As apparent from FIG. 35, the multi-layer thin film of iron carbide layers containing 17 mole % of carbon and 20 nm thick iron carbon-nitride layers containing 16 mole of carbon and 5.5 mole % of nitrogen, constitutes a magnetic thin film which can provide improved atmospheric durability particularly when the thickness of each iron carbide layer is in a range from 1 nm to 3000 nm.

Figure 36:
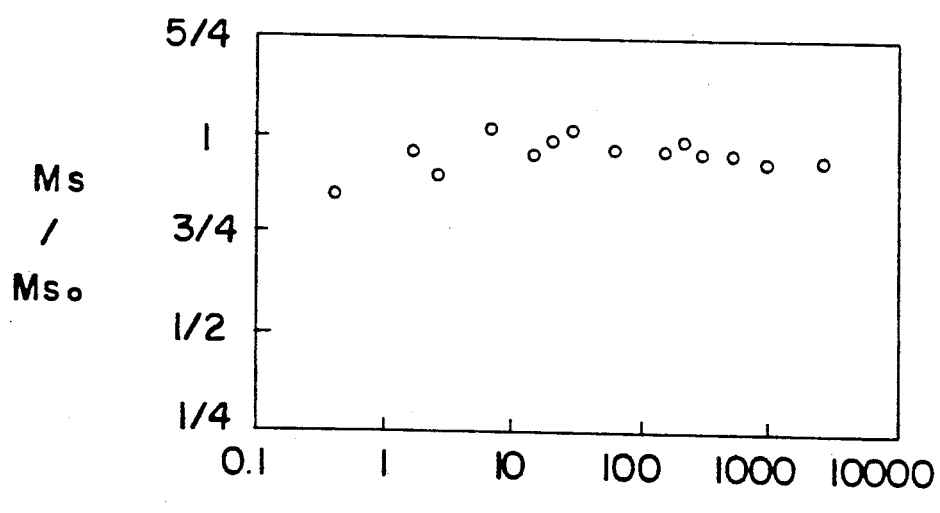
FIG. 36 is a graphic representation showing a relation between the thickness of each iron carbon-nitride layer which is varied in a magnetic thin film and the ratio of saturation magnetic flux densities between before and after exposure of the thin film to a 3% salt water mist for 200 hours.

FIG. 36 is a graphic representation showing variations of the saturation magnetic flux density of iron carbide-iron carbon-nitride multi-layer thin films expressed in a ratio between before and after exposure of the films to a 3% salt water vapor for 200 hours, in which each iron carbon-nitride layer containing 16 mole % of carbon and 5.5 mole % of nitrogen is varied in thickness from 0.5 to 3500 nm while each iron carbide layer containing 17 mole % of carbon has a constant thickness of 25 nm.

As apparent from FIG. 36, the multi-layer thin film of 25 nm thick iron carbide layers containing 17 mole of carbon and iron carbon-nitride layers containing 16 mole % of carbon and 5.5 mole % of nitrogen, constitutes a magnetic thin film which can provide improved atmospheric durability particularly when the thickness of each iron carbon-nitride layer is 0.5 nm or more.

Figure 37:
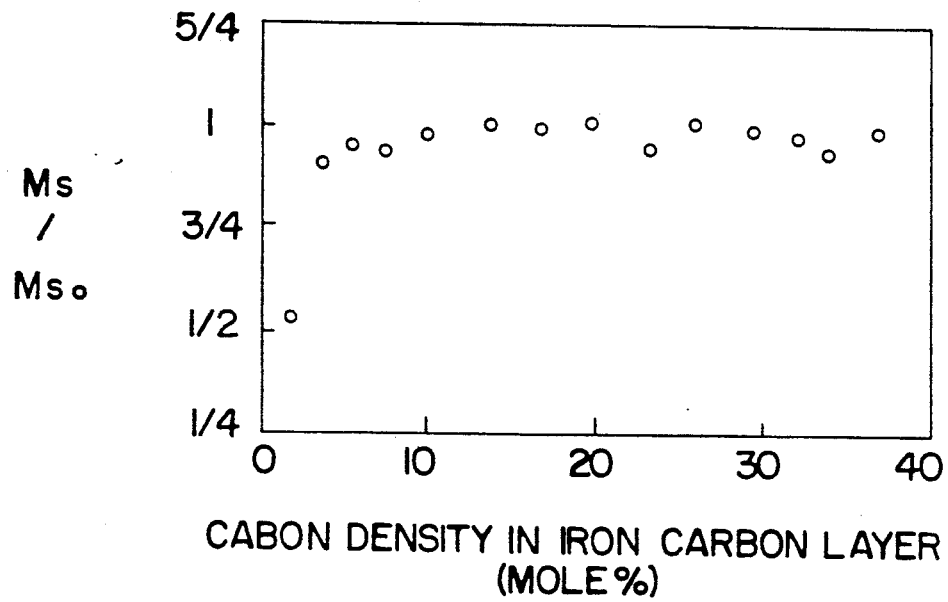
FIG. 37 is a graphic representation showing a relation between the carbon density of iron carbide layers which is varied in a magnetic thin film and the ratio of saturation magnetic flux densities between before and after exposure of the thin film to a 3% salt water mist for 200 hours.

FIG. 37 is a graphic representation showing variations of the saturation magnetic flux density of iron carbide-iron carbon-nitride multi-layer thin films expressed in a ratio between before and after exposure of the films to a 3% salt water vapor for 200 hours, in which each iron carbide layer having a constant thickness of 25 nm contains carbon from 1.0 mole % to 38 mole % while each iron carbon-nitride layer having a constant thickness of 20 nm contains 16 mole % of carbon and 5.5 mole % of nitrogen.

As apparent from FIG. 37, the multi-layer thin film of 25 nm thick iron carbide layers and 20 nm thick iron carbon-nitride layers containing 16 mole % of carbon and 5.5 mole % of nitrogen, constitutes a magnetic thin film which can provide improved atmospheric durability particularly when each iron carbide layer contains at least, 3 mole % of carbon.

Figure 38:
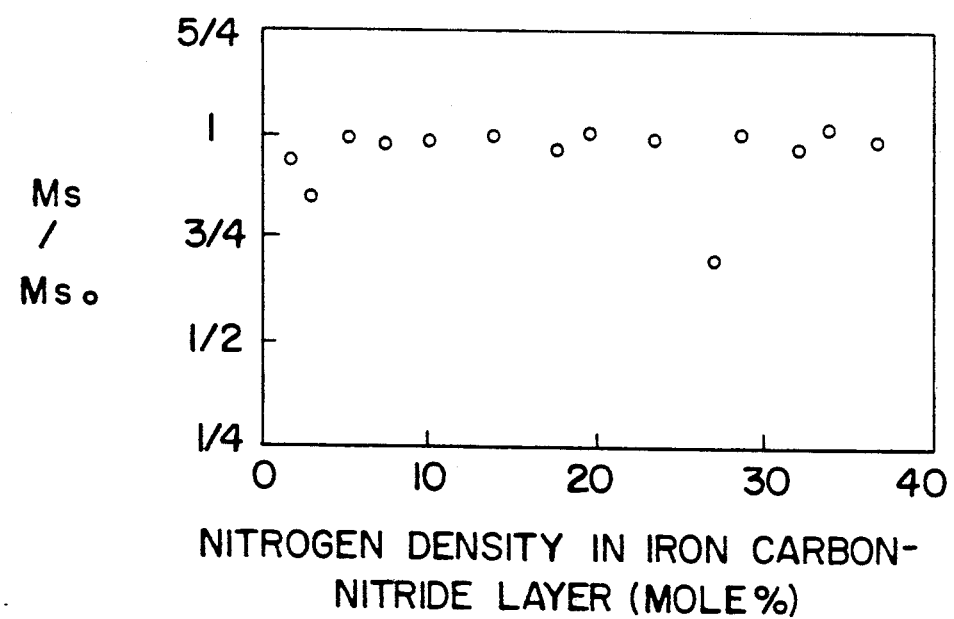
FIG. 38 is a graphic representation showing a relation between the nitrogen density of iron carbon-nitride layers which is varied in a magnetic thin film and the ratio of saturation magnetic flux densities between before and after exposure of the thin film to a 3% salt water mist for 200 hours.

FIG. 38 is a graphic representation showing variations of the saturation magnetic flux density of iron carbide-iron carbon-nitride multi-layer thin films expressed in a ratio between before and after exposure of the films to a 3% salt water vapor for 200 hours, in which each iron carbon-nitride layer having a constant thickness of 20 nm and a carbon/iron mole ratio of about 17/83 contains nitrogen from 0.2 mole % to 26 mole % while each iron carbide layer having a constant thickness of 25 nm contains 17 mole % of carbon.

As apparent from FIG. 38, the multi-layer thin film of 25 nm thick iron carbide layers containing 17 mole of carbon and 20 nm thick iron carbon-nitride layers having the carbon/iron mole ratio of about 17/83, constitutes a magnetic thin film which can provide improved atmospheric durability particularly except when the iron carbon-nitride layers contain 3 mole % and 28 mole % of nitrogen.

Accordingly, the soft-magnetic thin film of iron carbide layers and iron carbon-nitride layers laminated alternately can equally be improved in the atmospheric durability, the relative permeability and the saturation magnetic flux density by adjusting the thickness of each iron carbide layer, which contains 3 to 35 mole % of carbon, to 0.5 to 1000 nm and the thickness of each iron carbon-nitride layer, which contains 0.2 to 15 mole of nitrogen, to 0.5 to 300 nm.

EXAMPLE 7

For use for such a magnetic head as shown in FIG. 39, there was employed a soft-magnetic thin film 32 comprising 91 layers of iron carbide each of which has a thickness of 30 nm and contains 24 mole % of carbon, and 90 layers of iron each of which has a thickness of 5 nm, which are alternately laminated.

The magnetic properties of the magnetic head were measured in respect of a thin film produced on another substrate in the same manners and conditions. The results were advantageous in which the saturation magnetic flux density was 1.92 teslas, the coercive force in a hardly magnetizable direction was 0.13 Öe, and the relative permeability was 900 at 20 MHz.

When a voltage signal was recorded and reproduced with the above magnetic head, the reproduced voltage was improved by 24% as compared with a conventional thin-film head of amorphous cobalt alloy. After exposure of the magnetic head of the invention to a constant atmosphere having a relative humidity of 90% at 60° C. for such a period that causes the conventional magnetic head coated with amorphous cobalt alloy films to reduce by 30% in the reproduced output voltage, almost no change was observed in the reproduced, output voltage of the magnetic head of the invention.

Accordingly, a magnetic head having high relative permeability and high corrosion resistance with the saturation magnetic flux density of 1.92 teslas, can be provided with the use of the soft-magnetic thin films of the present invention adopted as magnetic permeable layer.

EXAMPLE 8

For use for such a magnetic head as shown in FIG. 39, there was employed a soft-magnetic thin film 32 comprising 46 layers of iron carbide each of which has a thickness of 60 nm and contains 12 mole % of carbon, and 45 layers of iron nitride each of which has a thickness of 5 nm and is mainly composed of $\gamma Fe_4N$, which are alternately laminated.

The magnetic properties of the magnetic head were measured in respect of a thin film produced on another substrate in the same manners and conditions. The results were outstanding in which the saturation magnetic flux density was 1.87 teslas, the coercive force in a hardly magnetizable direction was 0.24 Öe, and the relative permeability was 4100 at 20 MHz.

The electromagnetic conversion characteristic of the magnetic head measured by the reproduced signal voltage was improved 25% as compared with a conventional thin-film head of amorphous cobalt alloy. After exposure of the head to a constant atmosphere having a relative humidity of 90% at 60° C. for such a period that causes the conventional magnetic head coated with amorphous cobalt alloy films to reduce 30% in the reproduced output voltage, almost no change was detected in the reproduced output voltage of the magnetic head of this example.

Accordingly, a magnetic head having high relative permeability and high corrosion resistance with the saturation magnetic flux density of 1.87 teslas, can be provided with the use of the soft-magnetic thin films of the present invention adopted as magnetic permeable layer.

EXAMPLE 9

For use for such a magnetic head as shown in FIG. 39, there was employed a soft-magnetic thin film 32 comprising 50 layers of iron carbide each of which has a thickness of 25 nm and contains 17 mole % of carbon, and 51 layers of iron carbon-nitride each of which has a thickness of 20 nm and contains 16 mole % of carbon and 5.5 mole % of nitrogen, which are alternately laminated.

The magnetic properties of the magnetic head were measured in respect of a thin film produced on another substrate in the same manners and conditions. The results were outstanding in which the saturation magnetic flux density was 1.88 teslas, the coercive force in a hardly magnetizable direction was 0.17 Öe, and the relative permeability was 3800 at 20 MHz.

When a signal voltage was recorded and reproduced with the magnetic head of this example, the reproduced voltage was improved by 23% as compared with a conventional thin-film head of amorphous cobalt alloy. After exposure to a constant atmosphere having a relative humidity of 90% at 60° C. for such a period that causes the conventional magnetic head coated with amorphous cobalt alloy films to reduce by 30% in the reproduced output voltage, almost no change was detected in the reproduced output voltage of the magnetic head of this example.

Accordingly, a magnetic head having high relative permeability and high corrosion resistance with the saturation magnetic flux density of 1.88 teslas, can be provided with the use of the soft-magnetic thin films of the present invention adopted as magnetic permeable layer.

EXAMPLE 10

For use for such a magnetic head as shown in FIG. 39, there was employed a soft-magnetic film 32 comprising 90 layers of iron carbide each of which has a thickness of 30 nm and contains 24 mole % of carbon, 90 layers of iron each of which has a thickness of 5 nm, and 90 layers of silicon oxide each of which has a thickness of 3 nm, which are alternately laminated in a certain order. This example is similar to Example 7, except the presence of the non-magnetic material layers in the arrangement of the thin-filmed magnetic head. As compared with the thin-film head of Example 7, the magnetic head of this example was improved in the electromagnetic conversion characteristics measured by the reproducted output voltage about 20% higher at maximum throughout a high-frequency band of more than 5 MHz.

After exposure to a constant atmosphere having a relative humidity of 90% at 60° C. for such a period that causes the conventional magnetic head coated with amorphous cobalt alloy films to reduce by 30% in the reproduced output voltage, almost no change was detected in the reproducted output voltage of the magnetic head of this example as well as Example 7.

Accordingly, the electromagnetic conversion efficiency can be increased by providing the soft-magnetic thin film with non magnetic layers.

EXAMPLE 11

For use for such a magnetic head as shown in FIG. 39, there was employed a soft-magnetic film 32 comprising 45 layers of iron carbide each of which has a thickness of 60 nm and contains 12 mole of carbon, 45 layers of iron nitride each of which has a thickness of 5 nm and is mainly composed of $\gamma Fe_4N$, and 45 layers of silicon oxide each of which has a thickness of 3 nm, which are alternately laminated in a certain order. This example is similar to Example 8, except the inclusion of the non-magnetic material layers in the arrangement of the thin-film magnetic head. As compared with the thin-film head of Example 8, the magnetic head of this example was improved in the electromagnetic conversion providing characteristics measured by a reproduced output voltage about 20% higher at maximum throughout a high-frequency band of more than 5 MHz.

After exposure to a constant atmosphere having a relative humidity of 90% at 60° C. for such a period that causes the conventional magnetic head coated with amorphous cobalt alloy films to reduce by 30% in the reproduced output voltage, almost no change was detected in the reproduced output voltage of the magnetic head of this example as well as Example 8.

Accordingly, the electromagnetic conversion can be increased by providing the soft-magnetic thin film with non-magnetic layers.

EXAMPLE 12

For use for such a magnetic head as shown in FIG. 39, there was employed a soft-magnetic thin film 32 comprising 50 layers of iron carbide each of which has a thickness of 25 nm and contains 17 mole % of carbon, 50 layers of iron carbon-nitride each of which has a thickness of 16 nm and contains 16 mole % of carbon and 5.5 mole % of nitrogen, and 50 layers of silicon oxide each of which has a thickness of 4 nm, which are alternately laminated in a certain order. This example is similar to Example 9, except the inclusion of the non-magnetic material layers in the arrangement of the thin-filmed magnetic head. As compared with the thin film head of Example 9, the magnetic head of this example was improved in the electromagnetic convertion characteristics measured by a reproduced output voltage about 20% higher at maximum throughout a high-frequency band of more than 5 MHz.

After exposure of the head to a constant atmosphere having a relative humidity of 90% at 60° C. for such a period that causes the conventional head coated with amorphous cobalt alloy films to reduce by 30% in the reproduced output voltage, almost no change was detected in the reproduced output voltage of the magnetic head of this example as well as Example 9.

Accordingly, the electromagnetic conversion efficiency can be increased by providing the soft-magnetic thin film with non-magnetic layers.

What is claimed is:

1. A soft-magnetic thin film comprising layers of iron carbide and layers of at least one of iron, iron nitride and iron carbon-nitride, which layers are alternately laminated.

2. A magnetic head comprising magnetic permeable layers incorporated at least partially with the soft-magnetic thin film defined in claim 1, a magnetic gap, and coils for control of a magnetic flux across the magnetic permeable layers.

3. A soft-magnetic thin film in which iron layers and iron carbide layers containing carbon at a density providing a positive magnetostriction constant are alternately laminated, wherein the thickness of each iron layer is 0.5 to 60 nm and the thickness of each iron carbide layer is 3 to 800 nm.

4. A soft-magnetic thin film in which iron carbide layers containing 4 to 35% of carbon in mole percentage and iron nitride layers composed mainly of $\gamma Fe_4N$ are alternately laminated, wherein the thickness of each iron carbide layer is 3 to 1000 nm and the thickness of each iron nitride layer is 0.6 to 200 nm.

5. A soft-magnetic thin film in which iron carbide layers containing 8 to 25% of carbon in mole percentage and iron nitride layers composed mainly of $\gamma Fe_4N$ are alternately laminated, wherein the thickness of each iron carbide layer is 10 to 150 nm and the thickness of each iron nitride layer is 1 to 10 nm.

6. A soft-magnetic thin film in which iron carbide layers containing 3 to 35% of carbon in mole percentage and iron carbon-nitride layers containing 0.2 to 15% of nitrogen in mole percentage are alternately laminated, wherein the thickness of each iron carbide layer is 0.5 to 1000 nm and the thickness of each iron carbon-nitride layer is 0.5 to 300 nm.

7. A soft-magnetic thin film in which iron carbide layers containing 5 to 30% of carbon in mole percentage and iron carbon-nitride layers containing 5 t 10% of nitrogen in mole percentage are alternately laminated, wherein the thickness of each iron carbide layer is 5 to 100 nm and the thickness of each iron carbon-nitride layer is 5 to 90 nm.

8. A soft-magnetic thin film in which layers of iron carbide and layers of at least one of iron, iron nitride and iron carbon-nitride are alternately laminated, and a non-magnetic material layer is interposed between at least one pair of adjacent layers of the alternately laminated layers.

9. A magnetic head comprising magnetic permeable layers incorporated at least partially with the soft-magnetic thin film defined in claim 8, a magnetic gap, and coils for control of a magnetic flux across the magnetic permeable layers.

10. A soft-magnetic thin film in which iron layers and iron carbide layers containing carbon at a density providing a positive magnetostriction constant are alternately laminated, and a non-magnetic material layer is interposed between at least one pair of adjacent layers of the alternately laminated layers.

11. A soft-magnetic thin film in which iron carbide layers containing 4% to 35% of carbon in mole percentage and iron nitride layers composed mainly of $\gamma Fe_4N$ are alternately laminated, and a non-magnetic material layer is interposed between at least one pair of adjacent layers of the alternately laminated layers.

12. A soft-magnetic thin film in which iron carbide layers containing 8 to 25% of carbon in mole percentage and iron nitride layers composed mainly of $\gamma Fe_4N$ are alternately laminated, and a non-magnetic material layer is interposed between at least one pair of adjacent layers of the alternately laminated layers.

13. A soft-magnetic thin film in which iron carbide layers containing 3 to 35% of carbon in mole percentage and iron carbon-nitride layers containing 0.2 to 15% of nitrogen in mole percentage are alternately laminated, and a non-magnetic material layer is interposed between at least one pair of adjacent layers of the alternately laminated layers.

14. A soft-magnetic thin film in which iron carbide layers containing 5 to 30% of carbon in mole percentage and iron carbon-nitride layers containing 5 to 10% of nitrogen in mole percentage are alternately laminated, and a non-magnetic material layer is interposed between at least one pair of adjacent layers of the alternately laminated layers.

15. A method of making a multi-layer thin film of iron carbide and iron carbon-nitride comprising the steps of forming an iron carbon-nitride layer by supplying a nitrogen gas during sputtering with an iron carbide target, and forming an iron carbide layer without supplying the nitrogen gas, these steps being repeated.

* * * * *